US010453140B2

(12) United States Patent
Huang et al.

(10) Patent No.: US 10,453,140 B2
(45) Date of Patent: Oct. 22, 2019

(54) SYSTEM AND METHOD FOR ALLOCATING TRADITIONAL AND NON-TRADITIONAL ASSETS IN AN INVESTMENT PORTFOLIO

(75) Inventors: Dylan W. Huang, New York, NY (US); Todd Taylor, New York, NY (US)

(73) Assignee: New York Life Insurance Company, New York, NY (US)

( * ) Notice: Subject to any disclaimer, the term of this patent is extended or adjusted under 35 U.S.C. 154(b) by 0 days.

(21) Appl. No.: 13/359,035

(22) Filed: Jan. 26, 2012

(65) Prior Publication Data

US 2012/0173457 A1 Jul. 5, 2012

Related U.S. Application Data

(63) Continuation of application No. 13/341,009, filed on Dec. 30, 2011, which is a continuation-in-part of application No. 12/939,929, filed on Nov. 4, 2010.

(51) Int. Cl.
*G06Q 40/06* (2012.01)

(52) U.S. Cl.
CPC .................. *G06Q 40/06* (2013.01)

(58) Field of Classification Search
CPC ........ G06Q 40/06; G06Q 40/00; G06Q 40/08; G06Q 40/02; G06Q 40/04; G06Q 40/10; G06N 3/126

(Continued)

(56) References Cited

U.S. PATENT DOCUMENTS 5,774,881 A * 6/1998 Friend ................... G06Q 40/08
705/36 R
6,405,179 B1 6/2002 Rebane
(Continued)

FOREIGN PATENT DOCUMENTS

| AU | 199646919 | 1/1996 |
|----|-----------|--------|
| WO | 2004042532 | 5/2004 |
| WO | 2005048049 | 5/2005 |

OTHER PUBLICATIONS

William F. Sharpe, Capital Asset Prices: A theory of market equilibrium under conditions of risk; The Journal of Finance, vol. XIX, No. 3, Sep. 1964 (19 pages).*

(Continued)

*Primary Examiner* — Jessica Lemieux
(74) *Attorney, Agent, or Firm* — McDermott Will & Emery LLP

(57) ABSTRACT

A computerized method and system for allocating assets among a plurality of financial products for an investor portfolio includes calculating a solution space of financial vehicle combinations by assigning allocations to each financial vehicle in each financial vehicle combination and generating a set of simulations, for each of the vehicle combinations, of a value of the financial vehicle combination. The computerized method and system further includes receiving investor-specific information, the investor-specific information including a retirement objective. The method and system further includes selecting a set of financial vehicle combinations within the solution space based on the received investor-specific information; and allocating assets among the plurality of financial products based on the set of selected financial vehicle combinations and received investor-specific information.

27 Claims, 23 Drawing Sheets

(58) Field of Classification Search
USPC .......... 705/36 R, 35, 1.1, 2, 36 T, 38, 4, 37; 703/2
See application file for complete search history.

(56) References Cited

U.S. PATENT DOCUMENTS

| | | | | |
|---|---|---|---|---|
| 6,684,190 | B1* | 1/2004 | Powers | G06Q 40/06 705/36 R |
| 7,577,597 | B1* | 8/2009 | Allison | G06Q 20/102 235/379 |
| 7,668,773 | B1* | 2/2010 | Pruitt | G06Q 40/06 705/36 T |
| 7,689,501 | B1 | 3/2010 | Gastineau et al. | |
| 7,707,091 | B1* | 4/2010 | Kauffman | G06Q 40/06 705/36 R |
| 7,822,668 | B1 | 10/2010 | Benda | |
| 7,912,778 | B2* | 3/2011 | Nanjundamoorthy | G06Q 40/00 705/35 |
| 7,937,311 | B1 | 5/2011 | Zangari et al. | |
| 8,185,463 | B1* | 5/2012 | Ball | G06Q 40/08 705/2 |
| 8,341,063 | B1* | 12/2012 | Cernyar | G06Q 40/06 705/35 |
| 2003/0172018 | A1* | 9/2003 | Chen | G06Q 40/00 705/36 R |
| 2003/0195829 | A1 | 10/2003 | Oberuc | |
| 2003/0233301 | A1 | 12/2003 | Chen et al. | |
| 2005/0010516 | A1* | 1/2005 | Ivanov | G06Q 40/06 705/36 R |
| 2005/0015282 | A1* | 1/2005 | Gutman | G06Q 40/08 705/4 |
| 2005/0071266 | A1* | 3/2005 | Eder | G06Q 40/00 705/38 |
| 2005/0108138 | A1* | 5/2005 | Sperandeo | G06Q 40/00 705/36 R |
| 2005/0149422 | A1* | 7/2005 | Van Lier | G06Q 40/00 705/36 R |
| 2006/0212279 | A1* | 9/2006 | Goldberg | G06N 3/126 703/2 |
| 2007/0100726 | A1* | 5/2007 | O'Flinn | G06Q 40/00 705/36 R |
| 2007/0100727 | A1* | 5/2007 | Multer | G06Q 40/06 705/36 R |
| 2007/0112662 | A1* | 5/2007 | Kumar | G06Q 40/06 705/36 R |
| 2007/0288400 | A1* | 12/2007 | Menon | G06Q 40/00 705/36 R |
| 2008/0114703 | A1 | 5/2008 | Dahlberg et al. | |
| 2008/0201270 | A1* | 8/2008 | Marlowe-Noren | G06Q 40/06 705/36 R |
| 2009/0138410 | A1 | 5/2009 | Mocciolo | |
| 2009/0222310 | A1* | 9/2009 | Vollmer | G06Q 10/06313 705/7.23 |
| 2009/0281958 | A1* | 11/2009 | Abidi | G06Q 40/06 705/36 R |
| 2010/0010938 | A1* | 1/2010 | Dundas | G06Q 40/04 705/36 T |
| 2010/0100502 | A1* | 4/2010 | Gerber | G06Q 40/06 705/36 R |
| 2010/0121783 | A1* | 5/2010 | Lyons | G06Q 40/06 705/36 R |
| 2010/0131425 | A1* | 5/2010 | Stolerman | G06Q 10/067 705/36 R |
| 2010/0179920 | A1* | 7/2010 | Snodgrass | G06Q 40/06 705/36 R |
| 2010/0256996 | A1* | 10/2010 | Gerber | G06Q 40/08 705/4 |
| 2010/0268670 | A1* | 10/2010 | Dahlberg | G06Q 40/06 705/36 R |
| 2012/0278258 | A1* | 11/2012 | Ayal | G06Q 40/00 705/36 R |
| 2012/0296845 | A1 | 11/2012 | Andrews et al. | |

OTHER PUBLICATIONS

Weinstein, G.,: Simplify Five Ways to Automate Your Investment Portfolio, 2009, The Wall Street Journal, pp. 1-2.
New York State Deferred Compensation Plan: Self Directed Investment Account Handbook—Managing your own investments through a Schwab Personal Choice Account, 2005, pp. 1-13.
Non-Final Office Action dated Dec. 19, 2018 for U.S. App. No. 12/939,929, 17 pages.
Final Office Action dated Sep. 16, 2016 for U.S. App. No. 12/939,929, 14 pages.
Non-Final Office Action dated Jan. 14, 2016 for U.S. App. 12/939,929, 49 pages.
Final Office Action dated Mar. 15, 2013 for U.S. App. No. 12/939,929, 27 pages.
Non-Final Office Action dated 19/26/2012 for U.S. App. 12/939,929, 25 pages.
Markowitz, H., et al., "Portfolio Selection" Journal of Finance, Sep. 1952, pp. 77-91.
Sharpe, W., "Capital Asset Prices: A Theory of Market Equilibrium," Journal of Finance, Sep. 1964, 19 pages.

* cited by examiner

| Product Combination | % of Total Investment | | |
|---|---|---|---|
| | Model Portfolio | FIA | VA |
| 1 | 100% | 0% | 0% |
| 2 | 98% | 2% | 0% |
| 3 | 98% | 0% | 2% |
| 4 | 96% | 4% | 0% |
| 5 | 96% | 2% | 2% |
| ... | ... | ... | ... |

Age 60 Male, 4% Withdrawal

| Retirement Objective | Shorter than Average Life Expectancy | | | | Average Life Expectancy | | | | Longer than Average Life Expectancy | | | |
|---|---|---|---|---|---|---|---|---|---|---|---|---|
| | Model Portfolio | % | FIA % | VA % | Model Portfolio | % | FIA % | VA % | Model Portfolio | % | FIA % | VA % |
| Max Income Security (1) | 1 | 84% | 16% | 0% | 2 | 60% | 40% | 0% | 4 | 60% | 40% | 0% |
| (2) | 2 | 84% | 16% | 0% | 4 | 66% | 34% | 0% | 5 | 60% | 40% | 0% |
| (3) | 3 | 100% | 0% | 0% | 4 | 74% | 26% | 0% | 5 | 70% | 30% | 0% |
| (4) | 4 | 94% | 6% | 0% | 4 | 86% | 14% | 0% | 5 | 76% | 24% | 0% |
| Max Legacy Potential (5) | 5 | 90% | 10% | 0% | 5 | 86% | 14% | 0% | 5 | 100% | 0% | 0% |

FIG. 10

Age 65 Male, 5% Withdrawal

| Retirement Objective | Shorter than Average Life Expectancy | | | | Average Life Expectancy | | | | Longer than Average Life Expectancy | | | |
|---|---|---|---|---|---|---|---|---|---|---|---|---|
| | Model Portfolio | % | FIA % | VA % | Model Portfolio | % | FIA % | VA % | Model Portfolio | % | FIA % | VA % |
| Max Income Security (1) | 1 | 66% | 34% | 0% | 4 | 68% | 32% | 0% | 5 | 62% | 38% | 0% |
| (2) | 1 | 66% | 34% | 0% | 4 | 70% | 30% | 0% | 5 | 74% | 26% | 0% |
| (3) | 2 | 100% | 0% | 0% | 4 | 86% | 14% | 0% | 5 | 78% | 22% | 0% |
| (4) | 3 | 100% | 0% | 0% | 5 | 84% | 16% | 0% | 5 | 94% | 6% | 0% |
| Max Legacy Potential (5) | 4 | 98% | 2% | 0% | 5 | 100% | 0% | 0% | 5 | 100% | 0% | 0% |

| Age 65 Male, Average Life Expectancy, $1M Investment, 4% Inflation-Adjusted Withdrawal Rate |||||||
|---|---|---|---|---|---|---|
| Objective | Product Allocation |||| Income Risk (Age 92) | Median Legacy Potential (Age 86) |
| | Model Portfolio | MP % | IFA % | DVA % | | |
| Max Income Security (1) | Moderate | 62% | 38% | 0% | 6.6% | 837,265 |
| (2) | Balanced | 62% | 34% | 4% | 8.6% | 909,347 |
| (3) | Aggressive | 60% | 40% | 0% | 12.4% | 1,065,227 |
| (4) | Aggressive | 76% | 24% | 0% | 16.2% | 1,159,019 |
| Max Legacy Potential (5) | Aggressive | 88% | 12% | 0% | 18.4% | 1,243,978 |

Fig. 19

| Age 55 Male, Income Begins at Age 65, $1M Investment, 6% Inflation-Adjusted Withdrawal Rate | | | | | | |
|---|---|---|---|---|---|---|
| Objective | Product Allocation | | | | Income Risk (Age 92) | Median Legacy Potential (Age 86) |
| | Model Portfolio | MP % | DIA % | DVA % | | |
| Max Income Security (1) | Moderate | 60% | 40% | 0% | 3.0% | 1,738,221 |
| (2) | Growth | 60% | 40% | 0% | 6.6% | 2,243,790 |
| (3) | Aggressive | 60% | 40% | 0% | 8.2% | 2,541,814 |
| (4) | Aggressive | 76% | 24% | 0% | 12.0% | 2,730,515 |
| Max Legacy Potential (5) | Aggressive | 86% | 14% | 0% | 15.0% | 2,859,034 |

Fig. 23

| Alternate Risk Metric #1: Average Number of Years with Adjusted Income | | | | | | |
|---|---|---|---|---|---|---|
| Age 65 Male, Average Life Expectancy, $1M Investment, 4% Inflation-Adjusted Withdrawal Rate | | | | | | |
| Objective | Product Allocation | | | | Avg Years w/ Adjusted Income (age 92) | Median Legacy Potential (Age 86) |
| | Model Portfolio | MP % | IFA % | DVA % | | |
| Max Income Security (1) | Conservative | 60% | 28% | 12% | 0.05 | 756,755 |
| (2) | Growth | 60% | 40% | 0% | 0.32 | 967,297 |
| (3) | Aggressive | 60% | 40% | 0% | 0.51 | 1,065,227 |
| (4) | Aggressive | 72% | 28% | 0% | 0.71 | 1,130,243 |
| Max Legacy Potential (5) | Aggressive | 86% | 14% | 0% | 0.95 | 1,230,438 |

Fig. 24

| Alternate Risk Metric #2: Average Number of Years with Adjusted Income - Given Income Adjustment | | | | | | |
|---|---|---|---|---|---|---|
| Age 65 Male, Average Life Expectancy, $1M Investment, 4% Inflation-Adjusted Withdrawal Rate | | | | | | |
| Objective | Product Allocation | | | | Avg Years w/ Adjusted Income - Given Income Adjustment (age 92) | Median Legacy Potential (Age 86) |
| | Model Portfolio | MP % | IFA % | DVA % | | |
| Max Income Security (1) | Conservative | 60% | 40% | 0% | 1.54 | 728,162 |
| (2) | Moderate | 66% | 30% | 4% | 2.48 | 856,700 |
| (3) | Balanced | 68% | 32% | 0% | 3.37 | 936,552 |
| (4) | Growth | 84% | 16% | 0% | 4.49 | 1,106,673 |
| Max Legacy Potential (5) | Aggressive | 86% | 14% | 0% | 5.55 | 1,230,438 |

Fig. 25

| Alternate Risk Metric #3: Average *Squared* Years with Adjusted Income - Given Income Adjustment ||||||| 
| Age 65 Male, Average Life Expectancy, $1M Investment, 4% Inflation-Adjusted Withdrawal Rate ||||||| 
| Objective | Product Allocation |||| Avg Squared Years w/ Adjusted Income - Given Income Adjustment (age 92) | Median Legacy Potential (Age 86) |
|  | Model Portfolio | MP % | IFA % | DVA % |  |  |
| Max Income Security (1) | Conservative | 60% | 40% | 0% | 3.08 | 728,162 |
| (2) | Balanced | 62% | 36% | 2% | 12.46 | 909,536 |
| (3) | Growth | 66% | 34% | 0% | 21.98 | 1,002,007 |
| (4) | Growth | 88% | 12% | 0% | 31.26 | 1,124,649 |
| Max Legacy Potential (5) | Aggressive | 82% | 18% | 0% | 41.51 | 1,202,474 |

Fig. 26

SYSTEM AND METHOD FOR ALLOCATING TRADITIONAL AND NON-TRADITIONAL ASSETS IN AN INVESTMENT PORTFOLIO

COPYRIGHT NOTICE

This application is a continuation of U.S. application Ser. No. 13/341,009, filed Dec. 30, 2011, which is a continuation-in-part of U.S. application Ser. No. 12/939,929, filed Nov. 4, 2010, which are hereby incorporated herein by reference.

FIELD OF THE INVENTION

This invention relates to the field of computerized methods and systems for financial planning, and more particularly, to computerized methods and systems for providing investment or retirement portfolio allocations among a plurality of financial investment vehicles.

BACKGROUND OF THE INVENTION

People planning for retirement need to consider several risks. One is longevity risk, which is the risk of living longer than expected and potentially out living assets. Another is withdrawal risk, which is the risk that the retiree's rate of savings withdrawal is unsustainable and will completely deplete the savings before death. The third is inflation risk, where the purchasing power of the assets is reduced due to inflation. Finally, there is also the sequence of returns risk, which is the risk of poor market performance in the early years of retirement. Collectively, these risks could impact retirement outcome. Fortunately, a variety of investment vehicles exist in order to mitigate these risks.

One investment vehicle that some may use in retirement is common stock, which has the potential to produce high returns. Unfortunately, these returns can also be volatile, and losses due to stock volatility may severely impact retirement savings. Alternatively, investments in cash equivalents are far less volatile, but yields may be unacceptably low. An asset allocation made up of traditional assets, such as stocks, bonds, real estate, cash equivalents and other asset classes, may therefore be desirable for some investors to minimize volatility while maintaining acceptable returns. Model portfolios may be created by research departments of financial institutions to achieve a desired return for a given risk tolerance. Model portfolios are mostly created based on a risk return profile. For example, a conservative portfolio might include 65% bonds and 35% equities, and an aggressive portfolio might include 20% bonds and 80% equities. One who is skilled in the art will understand and appreciate that allocations of the portfolios can be changed based on various market forces and/or customer desires.

Another type of asset that can be purchased for retirement is an annuity. Annuities are available in many forms, e.g., deferred variable annuities, deferred fixed annuities, deferred income annuities, variable immediate annuities and fixed immediate annuities. A fixed immediate annuity is a well-known financial vehicle offered by insurance companies that is used to pay a person a certain sum of money in a series of distributions made at regular intervals, typically monthly or annually starting at a given date, based on a given amount of principal from an initial contribution of assets, commonly known as premium. Income annuities are available in many forms. The distributions may be made for a predetermined definite period, as in an annuity certain, or for as long as the person lives, as in a life annuity. Payments under a life annuity may terminate on the annuitant's death, as in a straight life annuity, or may continue to a beneficiary for a specified period after the annuitant's death, as in a life annuity with period certain. Alternatively, a life annuity may be based on two lives jointly, as in a joint and last-survivor annuity in which payments continue to be made to the survivor for the remainder of his or her life. The payments under an income annuity may be set to begin one payment interval after purchase of the annuity, as in an immediate income annuity, or after a specified amount of time, as in a deferred income annuity.

It is difficult, however, for retirees to determine what mix of asset classes, and in what proportion, will produce desired retirement objectives. In addition, investors may also have competing desires for their retirement assets. One such desire could be the legacy potential of the assets, which is the ability to leave assets to heirs, after the retiree's death. Another such desire is liquidity potential, including the ability to withdraw as cash or to convert to cash all or a large portion of the assets on relatively short notice, such as in the event of a medical emergency. Therefore, it can be important that the assets not be locked up in a financial vehicle that makes them inaccessible or illiquid. Simply using traditional assets via model portfolios may not adequately address all retirement risks, and the problem becomes even more difficult should the investor desire to allocate retirement assets among not only traditional assets, but also non-traditional assets or products, such as annuities.

Traditional asset allocations are constructed based on the modern portfolio theory ("MPT") developed by Harry Markowitz and William Sharpe. See Markowitz, Harry "Portfolio Selection," Journal of Finance, September 1952, pp. 77-91; and Sharpe, William "Capital Asset Prices: A Theory of Market Equilibrium," Journal of Finance, September 1964. MPT selects optimal portfolio allocations based on the investor's risk tolerance. Essentially, it is a mean-variance optimization. MPT is widely accepted in the academic and the finance industry as the primary tool for developing asset allocations. However, because MPT expresses an investor's preference between risk and expected return, it lacks consideration of retirement risk factors.

Consideration of an investor's desire outside of risk tolerance and expected return are not adequately addressed in existing portfolio allocation offerings. Present systems operate according to the MPT, and allocate assets among investments based on the investor's risk tolerance. Unfortunately, these systems do not consider retirement risks, such as likelihood of running out of money, legacy and/or liquidity desires. Therefore, there exists a need for an improved investment portfolio allocation system and method.

SUMMARY OF THE INVENTION

Systems and corresponding computer implemented methods are provider herein for allocating assets among a plurality of financial products for an investment portfolio that include the steps of: receiving investor-specified information, including a subjective life expectancy of the inventor and a retirement objective indicating a preference of the investor regarding income risk and legacy potential; and identifying using a processing device, from a solution space of financial product combinations, an optimal financial product combination for the investor based at least in part on the investor specified information, wherein the solution space comprises income risk and legacy potential information for a plurality of the financial product combinations that include at least one of traditional assets and non-traditional assets.

In at least one embodiment, the solution space of financial product combinations comprises a plurality of traditional and non-traditional asset combinations.

In at least one embodiment, the non-traditional asset of at least one of the product combinations comprises at least one annuity.

In at least one embodiment, the at least one annuity comprises at least one immediate annuity and at least one deferred annuity.

In at least one embodiment, the traditional asset of at least one of the product combinations comprises a model portfolio of traditional assets.

In at least one embodiment, the solution space of financial product combinations comprises a plurality of combinations each including one or more of a plurality of model portfolios and one or more of a plurality of annuities.

In at least one embodiment, the investor-specified information comprises a desired withdrawal rate and wherein the optimum financial product combination is identified further based on the desired withdrawal rate.

In at least one embodiment, the method further includes presenting the investor with a choice of subjective life expectancies comprising shorter than average, average, and longer than average, and wherein the subjective life expectancy received is one of shorter than average, average, and longer than average.

In at least one embodiment, an average life expectancy is associated with an age of the investor when there is a 50% survival probability; a shorter than average life expectancy is associated with an age of the investor when there is a 75% chance of survival, and a longer than average life expectancy is associated with an age of the investor where there is a 25% chance of survival, and wherein the optimal financial product combination is identified further based on the age associated with the subjective life expectancy.

In at least one embodiment, the method further includes presenting the investor with a range of retirement objectives comprising a plurality of choices on a scale that indicates a preference of income risk relative to legacy potential, and identifying the optimal financial product combination based on the selected relative preference.

In at least one embodiment, identifying the optimal financial product combination comprises identifying a subset of financial product combination based at least on the subjective life expectancy of the insured, identifying from the subset an efficient frontier line comprising a plurality of efficient financial product combinations over a range of income risk and legacy potential, splitting the frontier line into a plurality of partitions corresponding to a number of retirement objectives in the range of retirement objectives presented to the inventor; and identifying the optimal financial product combination within a partition corresponding to the investor specified preference of income risk relative to legacy potential.

In at least one embodiment, the method further includes calculating a retirement ratio that measures an incremental increase in legacy potential for an incremental change in income risk for each efficient product combination in the corresponding partition, and wherein the optimal financial product combination is identified as the efficient product combination with the greatest ratio.

In at least one embodiment, the investor-specified information comprises a desire or preference for the highest attainable income, e.g., specified as a percentage of the initial investment, subject to a minimum level of acceptable legacy potential, and a maximum level of income risk. The optimum financial product combination is identified based on these constraints.

BRIEF DESCRIPTION OF THE DRAWINGS

FIGS. 2 through 4 present illustrations of various embodiments for creating a solution space to facilitate a method for allocation of assets and products;

FIGS. 6 through 10 present illustrations of various embodiments for searching a solution space and presenting recommendations to facilitate a method for allocation of assets and products;

FIGS. 13-26 present illustrations of various embodiments for re-optimizing an allocation of assets and products.

DETAILED DESCRIPTION OF THE EMBODIMENTS

In the following description, reference is made to the accompanying drawings that form a part hereof, and in which is shown by way of illustration of specific embodiments in which the invention may be practiced. It is to be understood that other embodiments may be utilized and structural changes may be made without departing from the scope of the present invention.

As people transition from the earning and saving (accumulation) stage of life, towards the retirement and the spending (decumulation) stage, their investment philosophy changes. The term "retirement" as used herein refers to the stage where people ("retirees") withdraw funds from their accumulated savings to provide for some or all of their income needs, including those that retiree in the traditional sense, and those that continue to work into retirement and use a combination of wages and investment income to cover their expenses.

As noted above, many investment advisors have based their strategies on the mean-variance optimization of Modern Portfolio Theory ("MPT"). A major assumption underlying MPT is that investment risk can be measured by return volatility and rational investors will seek maximum expected investment return for a given level of volatility. Popular sentiment states that as investors age and approach retirement, they become more risk averse and should shift assets towards those with lower volatility. While mean-variance optimization may be appropriate for accumulation, there are a number of unique post-retirement risks that MPT does not explicitly address, such as longevity, inflation, sequence of return, and excess withdrawal rate. Longevity risk refers to the risk of living longer than planned. Sequence of return refers to the risk associated with the timing of returns, e.g., the impact on retirement outcome of early losses, gains, withdrawals, etc. vs. later losses, gains, withdrawals, etc., respectively. Excess withdrawal rate risk refers to the impact on the portfolio of too much being withdrawn too early.

To address the need for a more comprehensive retirement planning strategy, computer systems and corresponding methods are provide herewith that utilize a retirement allocation framework that optimizes retirement portfolios that contain various combinations of traditional and/or non-traditional assets. The framework analyzes an extensive collection of possible retirement portfolios, and then selects portfolios that maximize a retiree's (or pre-retiree's) potential upside, while minimizing one or more of the post retirement risks noted above.

Figure 1:
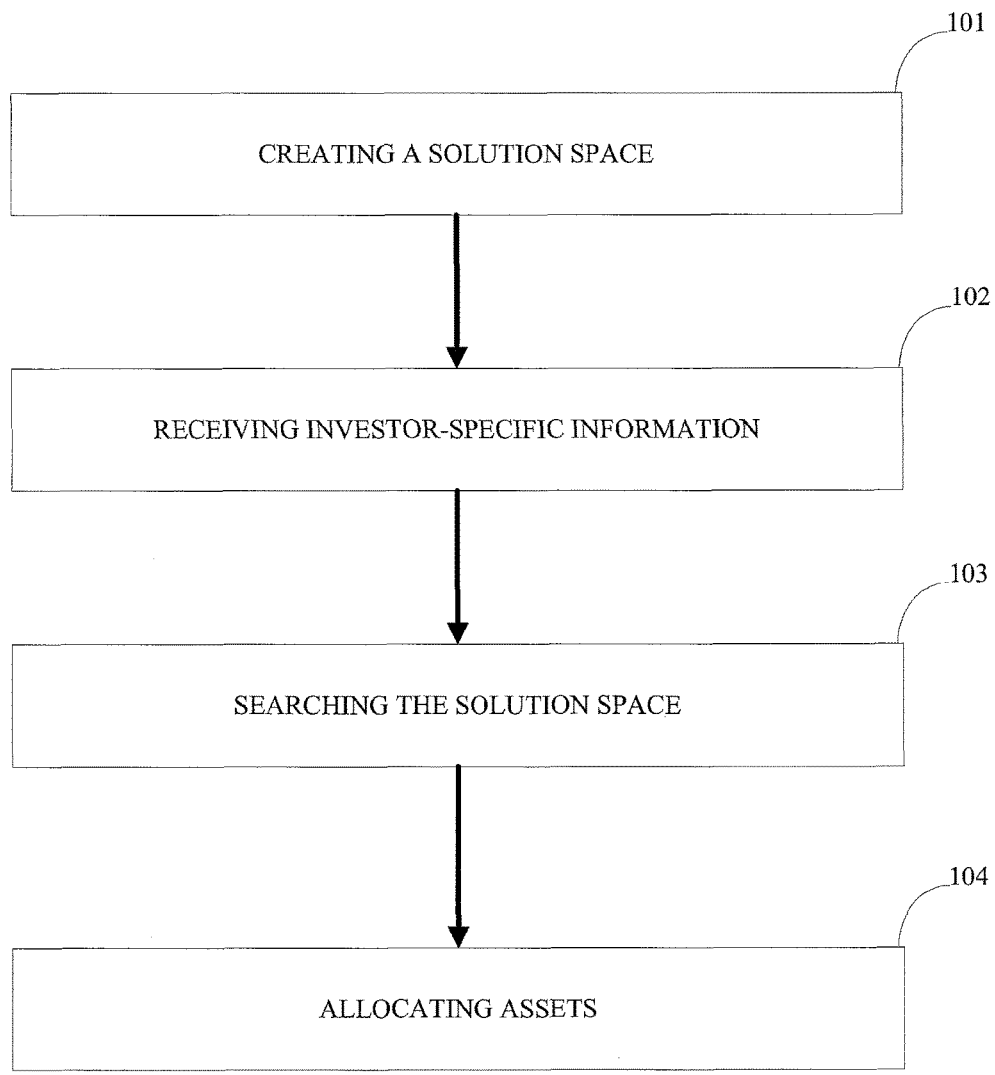
FIG. 1 illustrates a flowchart of the steps of one embodiment of a method for allocation of assets and products.

FIG. 1 illustrates a flow chart of one embodiment of a computerized method for providing an allocation of assets among a plurality of financial products for an investor portfolio. The flowchart represents a generalized description of one embodiment, wherein FIGS. 2-4 and the discussion below provide further aspects of the embodiment of FIG. 1 and additional embodiments thereto. To recommend the optimal allocation between a plurality of investment vehicles (also known as products), as shown in the embodiment in FIG. 1, four steps may generally be performed: (1) creating a solution space 101; (2) receiving investor-specific information 102; (3) searching the solution space; and (4) allocating assets and products 103. Additionally, a fifth step (not shown), re-optimization of the asset and product portfolio, may be performed.

Accomplishment of these goals is obtained by analyzing and combining model portfolios of traditional assets, and/or one or more non-traditional retirement portfolio assets or products, including annuities such as deferred variable annuities inclusive of all commonly selected riders (e.g., guaranteed minimum accumulation benefit, guaranteed lifetime withdrawal benefit, guaranteed minimum withdrawal benefit, guaranteed minimum death benefit, guaranteed minimum income benefit), deferred fixed annuities, deferred income annuities, variable immediate annuities, fixed immediate annuities inclusive of all commonly selected options/riders (e.g., inflation protection options such as cost of living adjustments and CPI-indexed payouts), etc. An optimal allocation of these traditional assets and/or non-traditional investment products may be derived based on the desire for maximizing potential legacy and/or liquidity needs from the investments, while minimizing the probability of running out of money during the investor(s)' lifetime are recommended. One skilled in the art will understand that additional or different types of products or assets may be added or substituted for the specific products and assets discussed in the described embodiments.

In this embodiment, the computerized method may begin, step 101, by creating a solution space.

Figure 2:
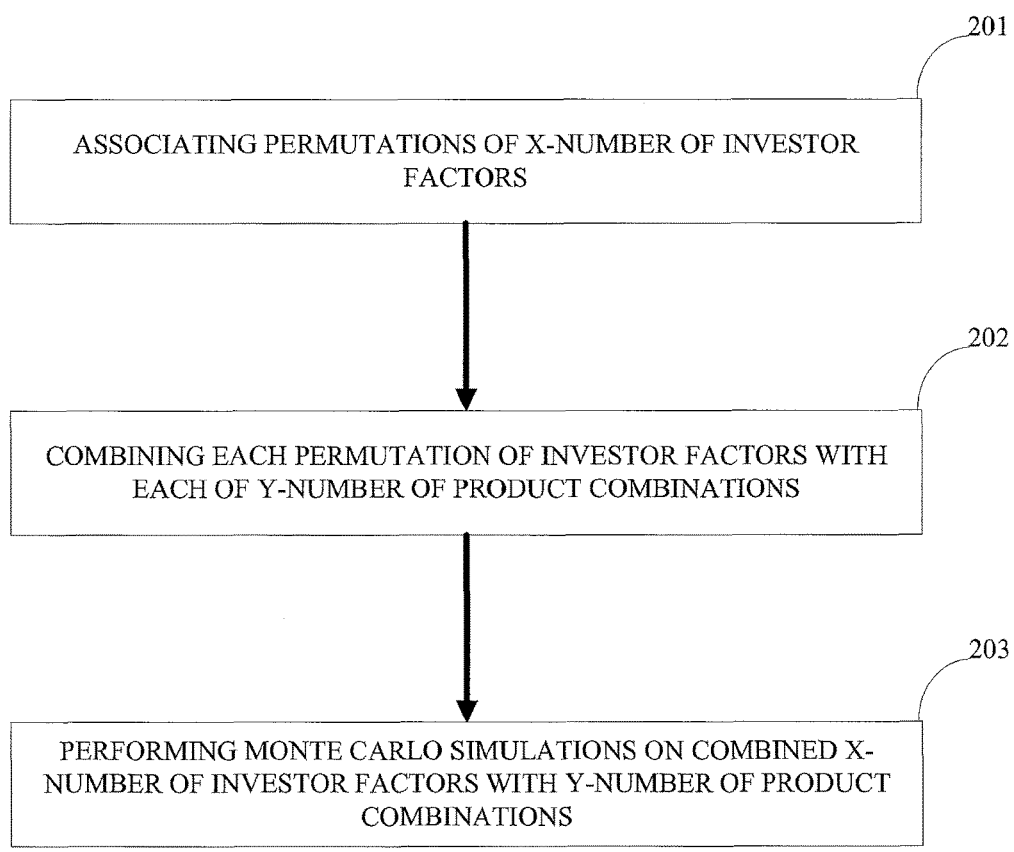

FIG. 2 illustrates a flow chart of an embodiment for creating the solution space. In this embodiment, the computerized method begins, step 201, by associating permutations of investor factors. As shown by the example in FIG. 3, these investor factors can include age(s) 302 (e.g., 50, 55, . . . , 80, etc.) and a desired withdrawal rate or income need 303 (e.g., 0.5%, 1.0%, . . . 10.0%, etc.). The desired withdrawal rate is applied to the initial investment amount. The withdrawal amount would then increase with inflation. In the example shown by FIG. 3, to reduce the number of calculations to create the solution space, in this embodiment investor ages are grouped into seven five-year periods ranging from age 50 to age 85 (e.g., 50-54, 55-59, etc.). As explained below, an increase in the number of ages or age groups increases the number of calculations to create the solution space. The number and types of investor factors may be increased, decreased, or varied.

Figure 3:
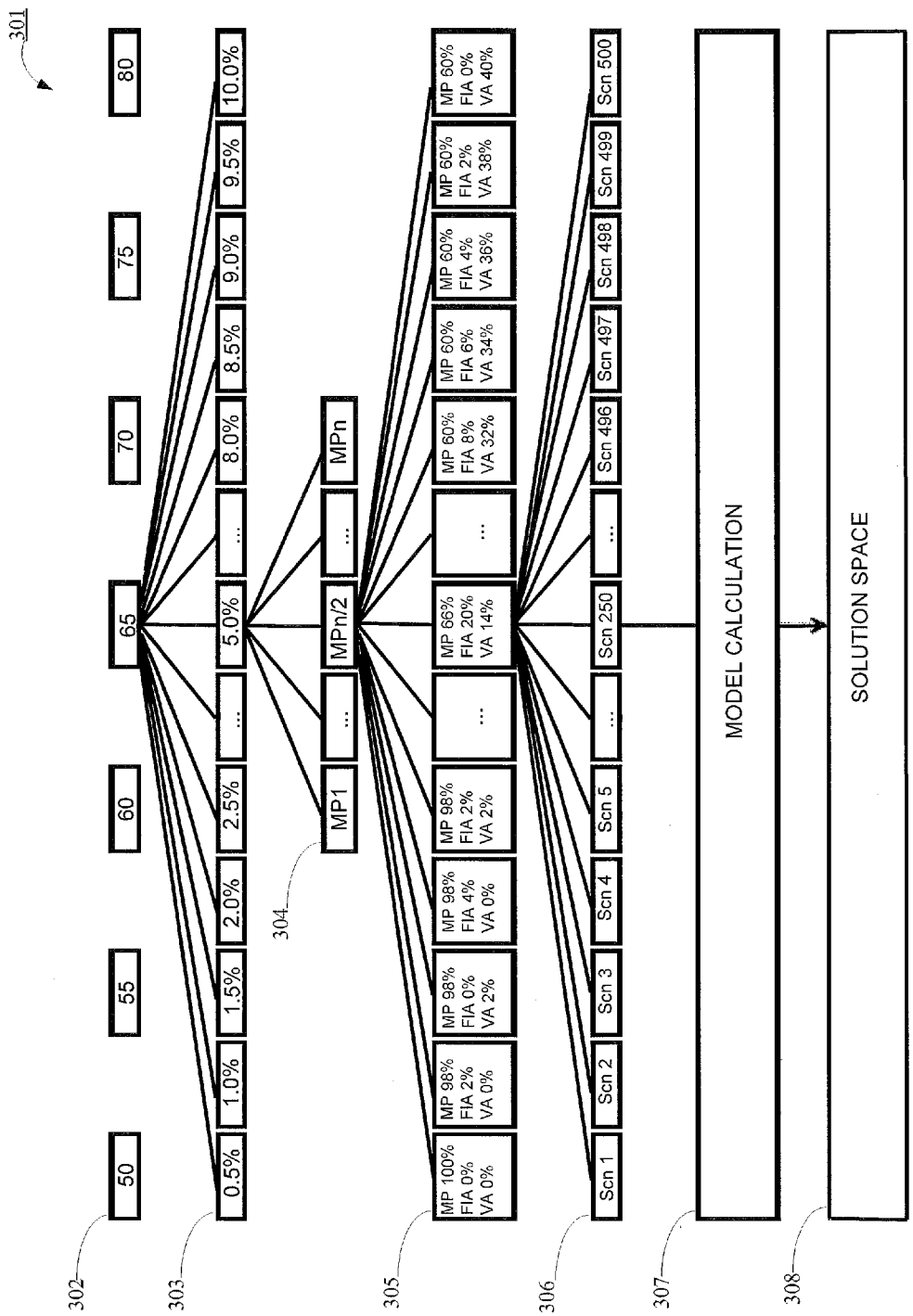

Referring back to FIG. 2, after the permutations of investor factors are associated in 201, the method proceeds to step 202. In step 202 each permutation from step 201 is combined with each traditional and/or non-traditional asset combination, including model portfolios of traditional assets 304 ($MP_1$ . . . $MP_n$). Examples of model portfolio and non-traditional asset combinations are shown in FIG. 3, element 305. In element 305, the different types of assets and products include traditional assets in the form of model portfolios (from 100% to 60%), and/or non-traditional assets, such as fixed immediate annuities, and deferred variable annuities with guaranteed lifetime withdrawal benefit. However, additional products may be used or substituted for those products, such as, deferred variable annuities with other commonly selected riders (e.g., guaranteed minimum accumulation benefit, guaranteed minimum withdrawal benefit, guaranteed minimum death benefit, guaranteed minimum income benefit), deferred fixed annuities, deferred income annuities and variable immediate annuities. The product availability included in the solution space will be specified by the financial intermediary, such as a financial advisory services firm. For example, one financial intermediary might choose to only include deferred variable annuities with guaranteed lifetime withdrawal benefit and fixed immediate annuities with their model portfolios, while another might choose to include all products.

Referring back to FIG. 2, next in step 203 Monte Carlo simulations on the combined investor factors and product combinations are performed. To perform the Monte Carlo simulations in this embodiment, the method substitutes a range of values for factors with inherent uncertainty to calculate the results. Results are calculated multiple times using different sets of random values from the Monte Carlo simulation model. The Monte Carlo simulations produce distributions of possible values (e.g., account balances and death benefit, etc.) based on the different asset and product allocations.

FIG. 3 provides an embodiment for creating the solution space described in FIG. 2. Each of the traditional and non-traditional asset allocation combinations is combined with investor(s)' age(s), desired withdrawal rates, and Monte Carlo simulations to create the solution space. A graphical representation of an example for analyzing possible allocation between model portfolios, a deferred variable annuity with guaranteed lifetime withdrawal benefit, and a fixed immediate annuity is shown in FIG. 3. The embodiment in FIG. 3 shows how the solution space is created for one particular financial intermediary distributing investment products. In FIG. 3, the solution space is created by starting at element 302 and selecting age 50, then at element 303 a 0.5% withdrawal rate is chosen, then at element 305 a 100% investment in model portfolio one is selected. This combination is then applied to Monte Carlo scenario 1, shown in element 306. The model then performs the model calculation, element 307, and projects the annual liquid asset values, legacy values and other variables for that combination of factors, and stores the results in a solution space database. The projections are stored in solution space database 308. The solution space database as well as any of the data discussed herein can be a table, a relational database, or any other type of database known in the art.

After projecting scenario 1, the model repeats the calculations for Monte Carlo scenarios 2 through 500. The number of Monte Carlo scenarios can vary. At this point, one set of the 500 Monte Carlo scenarios has been completed. The process repeats for the same age (50 years old) and withdrawal percentage (0.5%), but this time the percentage of the investment in model portfolio is changed to 98% and the investment in the fixed immediate annuity is changed to 2%. For each model portfolio in this embodiment, the method will perform 500 Monte Carlo simulations for each asset and product combination and perform model calculation 307 and store the results in solution space 308.

After 500 scenarios are completed for the second time by analyzing the second asset and product combination in element 305, the model calculates the next asset and product combinations and continues until the end of the asset and product combination permutations. FIG. 4 shows an embodiment of the different asset and product combinations that are possible. In the embodiment in FIG. 4, each asset and product combination, element 401, includes allocations of model portfolio 402, fixed immediate annuity ("FIA") 403, and variable annuity with guaranteed lifetime withdrawal benefit ("VA") 404. The percentage of total investment, 405, equals 100 percent for each asset and product combination 401.

Referring back to the embodiment in FIG. 3, at the end of the first investor permutation (age 50 and 0.5% withdrawal) with model portfolio one, 500 Monte Carlo simulations times 231 product combinations, which equals 115,500 runs have been completed. The process repeats for model portfolio two, shown in element 304, and continues until the last model portfolio has been analyzed. If the financial intermediary has five model portfolios, then 500 Monte Carlo simulations times 231 product combinations times the 5 model portfolios, which totals 577,500 runs will have been completed. The process continues until all 20 withdrawal rates, 0.5% to 10% in 0.5% increments, have been calculated, equaling 500×231×5×20=11,550,000 runs. At this point all the runs for age 50 have been completed, and analysis will repeat until all the ages have been analyzed, totaling around 500×231×5×20×7 which equals about 80 million runs to create the solution space (element 308) for this embodiment. One skilled in the art will appreciate that including more products, more model portfolios, smaller incremental increases in withdrawal rates, more ages, additional investor factors, or more Monte Carlo scenarios in the solution space, increases the number of runs.

Figure 5:
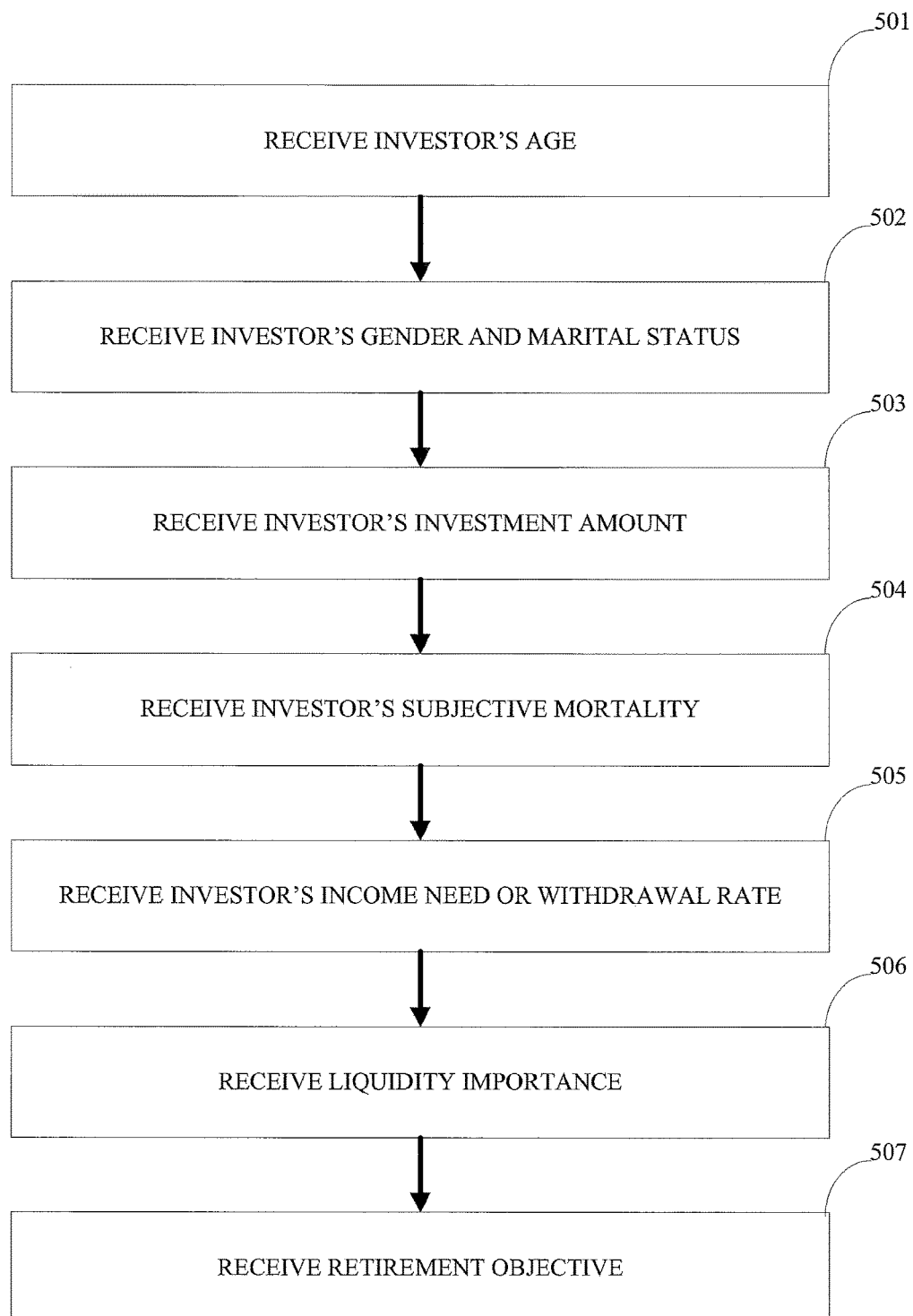
FIG. 5 illustrates a flow chart of the steps of one embodiment for surveying an investor to facilitate a method for allocation of assets and products.

Referring back to the embodiment depicted in FIG. 1, the next step, 102, is receiving investor-specific information. This step is further illustrated by the embodiment in FIG. 5, showing possible steps for surveying the investor(s) to gather investor-specific information. First the investor(s)' age(s) is received at step 501; next in step 502 the investor (s)' gender(s), and if the investor is a joint participant, such as a married couple, the marital status of the couple is received. Next in step 503, the investment amount is received.

Figure 15:
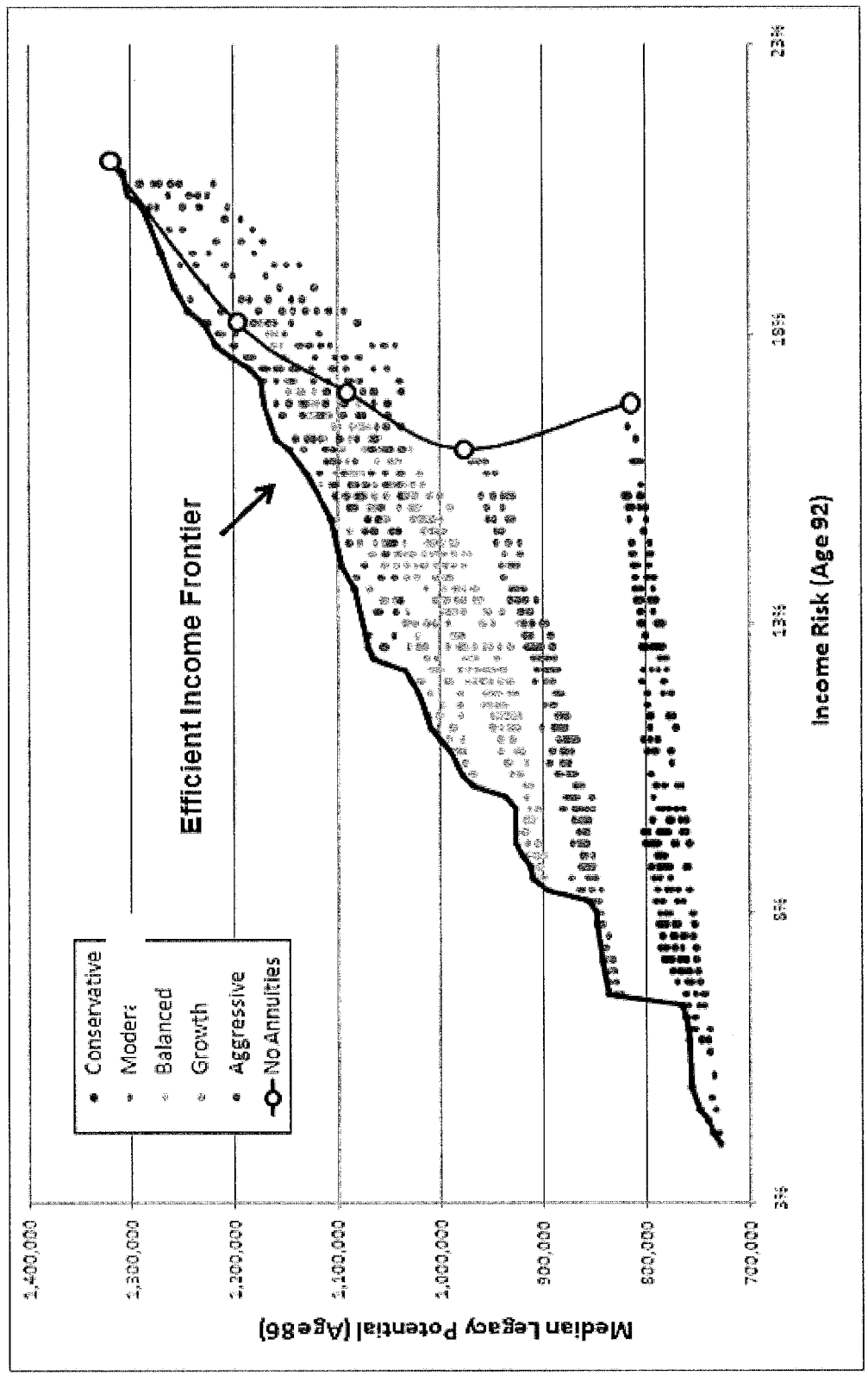

In step 504 subjective mortality of the investor is received. The subjective mortality reflects the investor(s)' belief as to how long the investor will live; in the case of a joint investor, each investor can be individually polled and the combined subjective mortality can be calculated. For example, the inventor(s)' belief may be one of: shorter than average, average, and longer than average, based on health status and family history. The subjective mortality may be used to determine the planning period for creating an income frontier for the inventor(s). An income frontier is generally a plot of the outermost of a plurality of portfolio combinations using legacy potential and income risk as axes, as shown in FIG. 15.

Legacy potential may be measured as median account balance plus any applicable death benefits at the subjective life expectancy. In one embodiment, for an average life expectancy, subjective life expectancy is measured as the year when there is a 50% survival probability. For shorter-than-average life expectancy, it becomes the year when there is a 75% chance of survival and for longer-than average life expectancy it is measured as the year there is a 25% survival likelihood. In one embodiment, for an average life expectancy, income risk is measured as the percentage of economic scenarios where assets remain by the 75th percentile of longevity (25% chance of survival). The shorter and longer life expectancies Income Risk is measured at the year when the survival probability is 50% and 10%, respectively. The allocation framework presented herein may factor in a mortality margin to ensure an element of income safety by measuring income risk beyond subjective life expectancy.

Next in step 505 the investor(s)' income need or desired withdrawal rate is received. The desired withdrawal rate is applied to the initial investment amount. In this embodiment, the withdrawal amount requested by the investor(s) would increase with inflation. The income need or desired withdrawal rate reflects the amount of income that the particular investor(s) will need, which can be based on the investor(s)' lifestyle, among other factors.

The investor(s) may also be polled regarding the importance of liquidity in the early retirement years, step 506. In step 507 a selection by the investor(s) from among a range of retirement objectives is received. The retirement objectives reflect the desires of an investor(s) between a range of choices, such as whether the investor(s) seeks income security or legacy potential. Income security reflects, for example, the relative stability of cash flows for the life of the investor. A legacy potential reflects, for example, the desire of an investor(s) to leave as much as possible to heirs after death.

The range between retirement objectives may be presented as an alphanumeric scale, e.g., 1, 2, . . . 5, etc., with one end of the scale indicating preference for one retirement objective over another retirement objective, and the other end of the scale indicating preference for the other retirement objective. For example, 1 may represent a desire for maximum income security and 5 may represent maximum legacy potential. If the investor(s) has high liquidity needs, as indicated by the investor(s) in step 506, the retirement objectives presented in step 507 may range from maximum income security to maximum liquidity potential. On the other hand, if the investor(s) has low liquidity needs, the retirement objectives presented in step 507 may range from maximum income security to maximum legacy potential. As will be explained below, the retirement objective may be used to identify which of a plurality of efficient portfolios identified based on investor-specific information are best suited for an individual investor. Additionally, an inflation assumption, not shown, can also be defined by the financial intermediary. The information gathered in the investor survey serves as a basis for searching the solution space in step 103 of FIG. 1.

Figure 16:
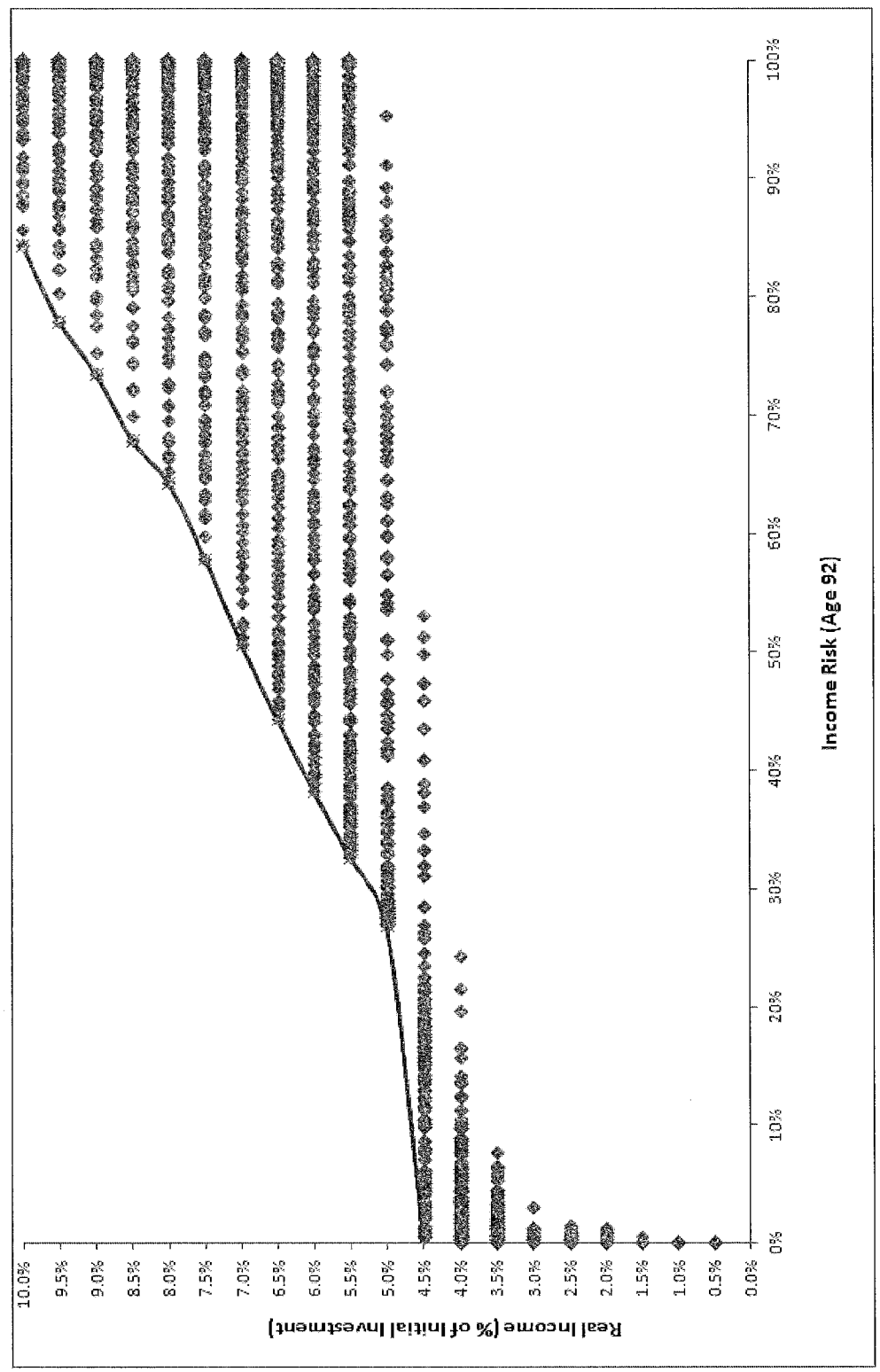

Investors whose retirement objectives reveal that they have a weaker preference for legacy potential and a stronger preference for higher consumption in the course of retirement can be better served through an alternate frontier, created using real income and income risk as axes, as shown in FIG. 16. In this view, for every level of withdrawals, which may be expressed as a percentage of the initial investment, the recommended portfolios are the portfolio of minimum income risk. The processes discussed herein would remain applicable to this alternate view of the frontier.

The third step in the embodiment shown in FIG. 1 is searching the solution space, element 103, to determine which optimal traditional and/or non-traditional asset combination the investor(s) should select, based on the investor-specific information gathered previously. A further embodiment for searching the solution space in step 103 is shown in the flow chart of FIG. 6.

Figure 6:
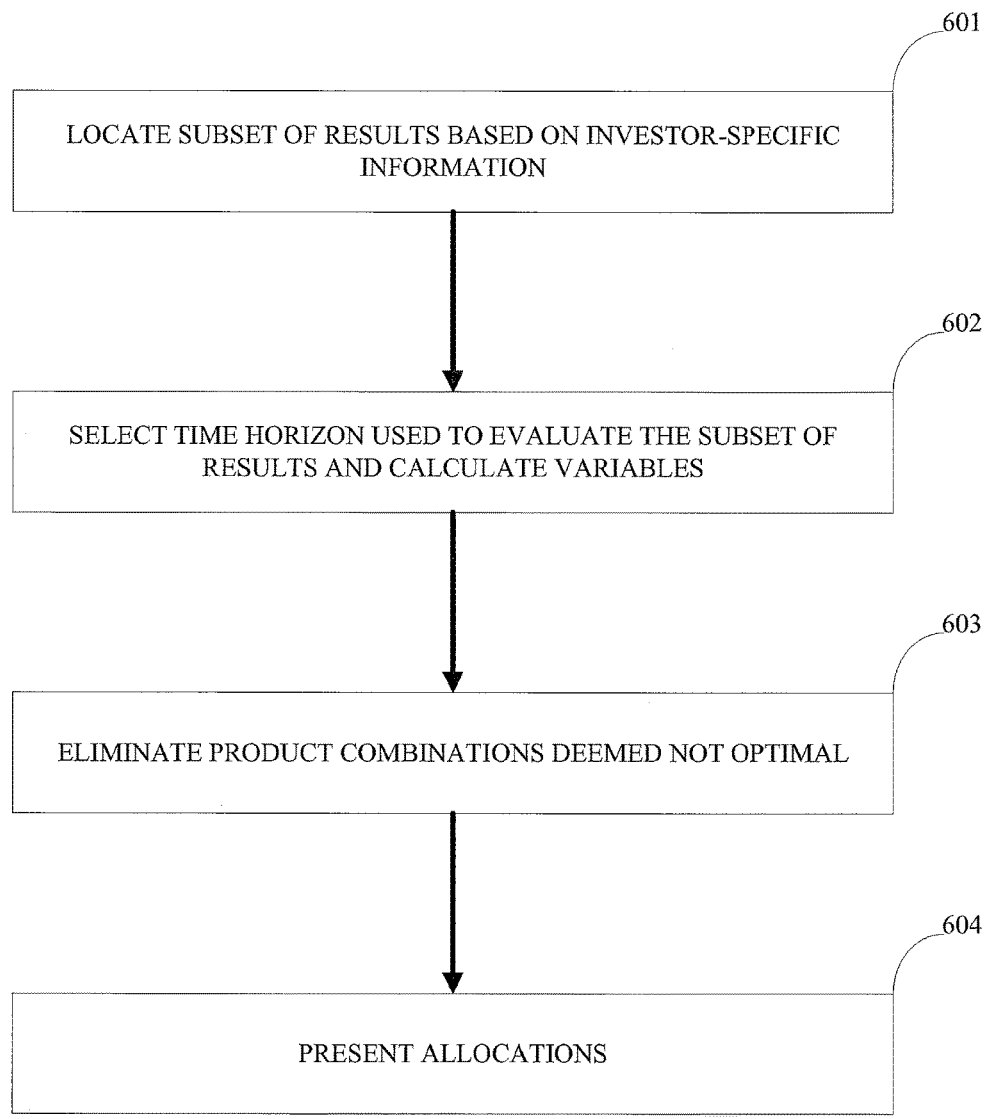

In step 601 of the embodiment shown in FIG. 6 a subset of results based on investor-specific information gathered previously is located from the solution space. For a defined age(s), gender(s), marital status, subjective life expectancy(s), desired withdrawal rate, and/or importance of income security vs. legacy potential, a graphical representation of optimal asset and product combinations can be created, as shown in FIG. 15. Thereafter, depending on the investor(s)' retirement objectives, e.g., income security vs. legacy potential, one or more frontier line may be identified that includes a set of optimal allocation between traditional assets and/or non-traditional assets for the range of retirement objectives.

For example, if the investor is a 65-year-old single male and would like to invest $1 M with an annual withdrawal of $40,000, the subset of results for a person at age 65 and a 4% withdrawal rate are located from the solution space. Continuing with the example where a financial intermediary chooses to include a deferred variable annuity with a guaranteed lifetime withdrawal benefit and a fixed immediate annuity with their five model portfolios, the subset of results will have 5×231=1,155 sets of Monte Carlo projections.

Next, in step 602, based on the gender and subjective life expectancy questions, the time horizons used to evaluate the 1,155 product combinations are selected. After selecting the time horizons, the following variables may be calculated in step 602. For each set of Monte Carlo projections, the variables that may be calculated are: (1) a statistical measurement of the legacy potential at a subjective life expectancy; and (2) the probability of ruin or income risk at a time horizon beyond the subjective life expectancy. Then, in step 603, asset and product combinations that are not optimal relative to each other can be eliminated. For example, if the statistical measurement chosen is the $50^{th}$ percentile, an asset combination having a $50^{th}$ percentile legacy benefit of $100,000 and a probability of ruin of 2% may be selected over an asset combination having a $50^{th}$ percentile legacy benefit of $85,000 and the same probability of ruin.

Figure 7:
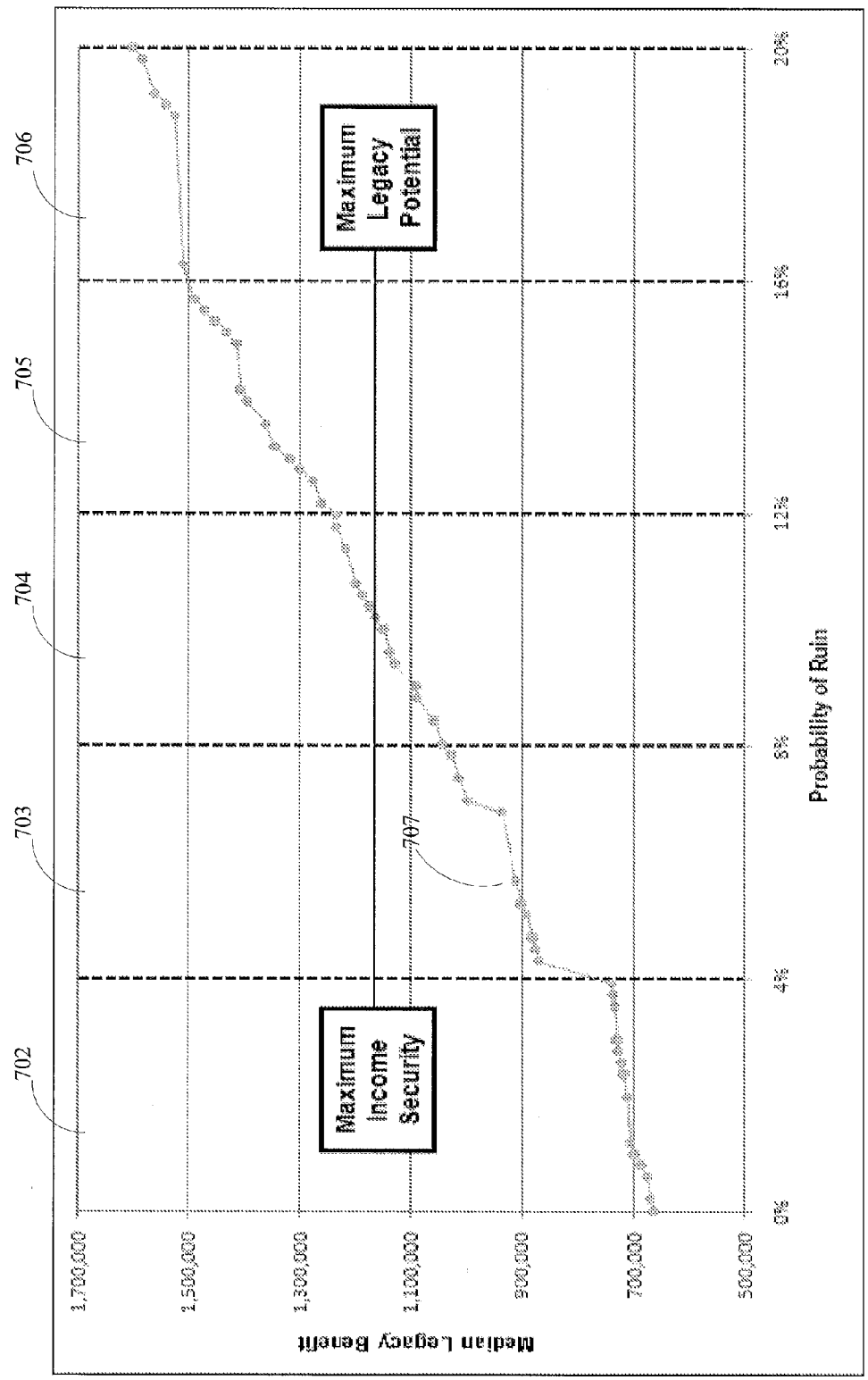

Based on the asset and product combinations that are not eliminated in step 603, an appropriate income frontier line can be created, as shown by the example in FIG. 7 and also in FIG. 15. The income frontier designates product combination efficiency, but still leaves the question of which portfolio is optimal. To determine the optimal efficient portfolio, the income frontier may be evenly split across income risk (across the x-axis) into a number of partitions corresponding to the alphanumeric scale used to define the range of retirement objectives. For example, if the alphanumeric scale ranges from 1 to 5 with a granularity of 1, the income frontier may be split into five equal partitions. The system may then select as the optimal efficient portfolio the efficient portfolio(s) falling within the partition corresponding to the score specified by the investor. Thus, if the investor specified a score of 3 in the range between 1 (maximum income security) and 5 (maximum legacy potential), the optimum efficient portfolio(s) for the particular investor will be the portfolios falling within the third or middle partition. All other product combinations may be eliminated.

FIG. 7 assumes that there are five retirement objectives and that the investor(s) has low liquidity needs. Further, FIG. 7 shows retirement objective partitions 702 through 706, and a graph of the optimal asset and product allocations, one of which is represented by element 707. The frontier represented by the line graph in FIG. 7 is partitioned into five sections (elements 702-707), one section for each retirement objective. The optimal product and asset combinations that result in the lowest probability of ruin, represented by partition 702, are suitable for investors who want Maximum Income Security. The product and asset combinations that result in the highest legacy benefits are suitable for investors who want Maximum Legacy Potential, represented by partition 706. If the investor has high liquidity needs, a similar graph can be created with the vertical axis showing liquid asset values. The last partition of such graph will be suitable for one who wants Maximum Liquidity Potential.

In a more specific example, given an age of an investor, a subjective life expectancy, a withdrawal rate, and low liquidity importance in the early retirement years, the legacy benefit and probability of ruin can be graphed. Again, in this example, the statistical measurement of $50^{th}$ percentile is used. Each dot on the graph, one of which is shown as element 707 in FIG. 7, represents an optimal product and asset combination for a sixty-five-year-old single male with an average subjective life expectancy, an initial 4% withdrawal rate and low liquidity needs in the early retirement years. Each dot 707 represents an optimal combination, that is, the combination that produces the highest median legacy benefit for a given probability of ruin. The five partitions 702-707, ranging from Maximum Income Security to Maximum Legacy Potential, are separated by the dotted lines and are evenly split among the probability of ruin. Each of these five partitions corresponds to the range between retirement objectives received in step 102 of FIG. 1.

Referring back to FIG. 7, within each of the five partitions 702-706, the asset and product combination that produces the highest statistical ratio, such as a legacy-to-ruin or retirement ratio, may be selected as the optimal product allocation. In one embodiment, in each of the five partitions 702-706, an asset and product combination that produces the highest legacy-to-ruin ratio may be selected. One form of this expression is:

$$\frac{\text{Legacy}_{50th\,Percentile}}{\text{Investment}} \times \frac{1}{\psi}$$

Where $$\frac{\text{Legacy}_{50th\,Percentile}}{\text{Investment}}$$

represents a statistical measurement of legacy benefit and ψ represents a statistical distribution of risk for a given asset and product combination.

In another embodiment, multiple efficient product allocations in a partition are analyzed relative to a retirement ratio that measures each portfolio's incremental increase in legacy potential for an incremental change in income risk as compared to the first efficient point. The optimal product combination may be the one that generates the largest retirement ratio within the retirement-objective-appropriate income frontier partition. One form of the retirement ratio expression is:

$$\text{Retirement Ratio} = \frac{LegacyPotential_x - LegacyPotential_y}{\text{Investment} \times (\Psi_x - \Psi_y)}$$

where $x$ is the efficient product combination being evaluated and $y$ is the efficient product combination with the lowest income risk In another embodiment, the highest liquidity-to-ruin ratio may be used if the investor(s) has high liquidity needs in the early retirement years. Thus, one asset and product combination for each retirement objective for a given age(s), gender(s), marital status, subjective life expectancy(s), liquidity importance, and income need can be recommended.

Figure 8:
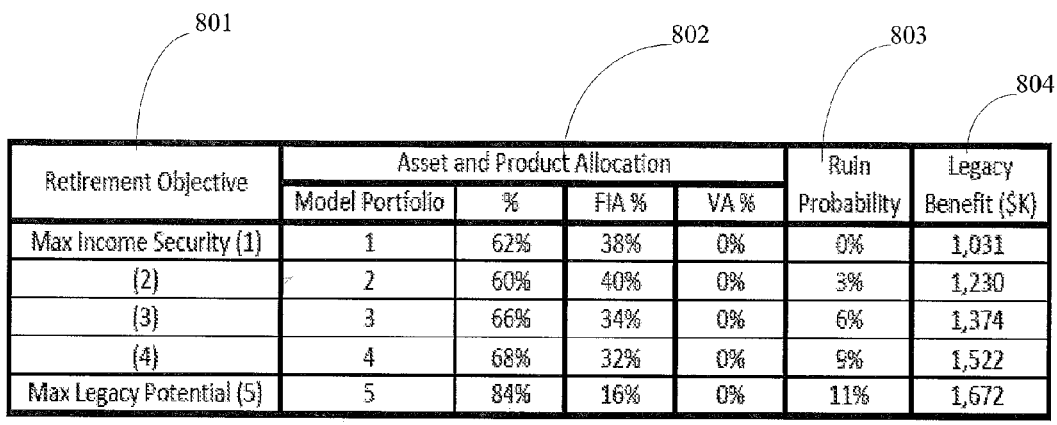

FIG. 8 depicts an example of optimal asset and product combinations for a specific investor with low liquidity needs. FIG. 8 includes representations for the investor's retirement objective 801, asset and product allocation 802, ruin probability 803, and the chosen statistical measurement of legacy benefit 804. Accordingly, based on the investor's retirement objective 801 this example shows the portfolio allocations associated with five retirement objectives, spanning from "maximum income security" to "maximum legacy potential." If the investor chooses "maximum income security," then 62% of assets allocated to the model portfolio one, 38% of assets allocated to the fixed immediate annuity, and 0% of the assets allocated to the variable annuity are recommended. The ruin probability for such an allocation of assets and products and the legacy benefit can also be presented.

Additional examples of product and asset allocations for investor-specific factors are shown, in FIGS. 9 and 10. FIG. 9 presents examples of optimal allocations for a male investor, age 60 with a 4% withdrawal rate. FIG. 10 presents examples of optimal allocations for a male investor, age 65 with a 5% withdrawal rate.

In FIG. 8, based on the investor's retirement objective, one combination from among the five presented is selected. The selected combination represents the optimal product and asset allocation while considering the investor's age, gender, marital status, subjective life expectancy, income need, liquidity importance, and retirement objective. This selected portfolio can then be presented to the investor in step 104 of FIG. 1.

In another embodiment, the frontier can be constructed with alternate retirement objectives, optimizing on the income level, which is presented as a trade-off against income risk. A graphical representation of optimal asset and product combinations can be created, as shown in FIG. 16 where for every level of real income the recommended portfolios are the portfolio of minimum income risk, and among these, the portfolio with the highest legacy potential is recommended.

Figure 11:
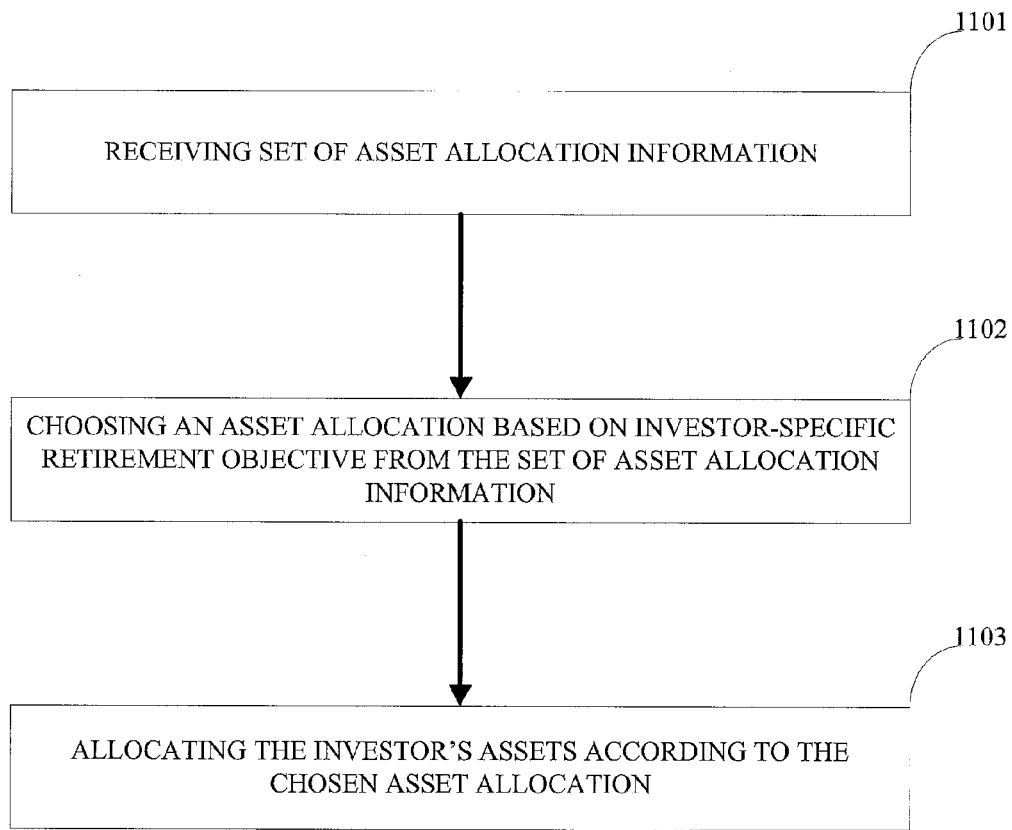
FIG. 11 illustrates a flowchart of the steps for one embodiment for allocation of assets and products.

FIG. 11 illustrates a flowchart of the steps for one embodiment for allocating assets and products as indicated by step 104 in FIG. 1. In step 1101 a set of asset and product allocation information is received. The asset and product allocation information may be calculated by any of the embodiments contained in FIGS. 1-10. Next, in step 1102 an asset and product allocation based on the investor-specific retirement objective is chosen from the set of asset and product allocation information. Finally, in step 1103 the investor(s)' funds are allocated according to the chosen allocation from step 1102.

Figure 12:
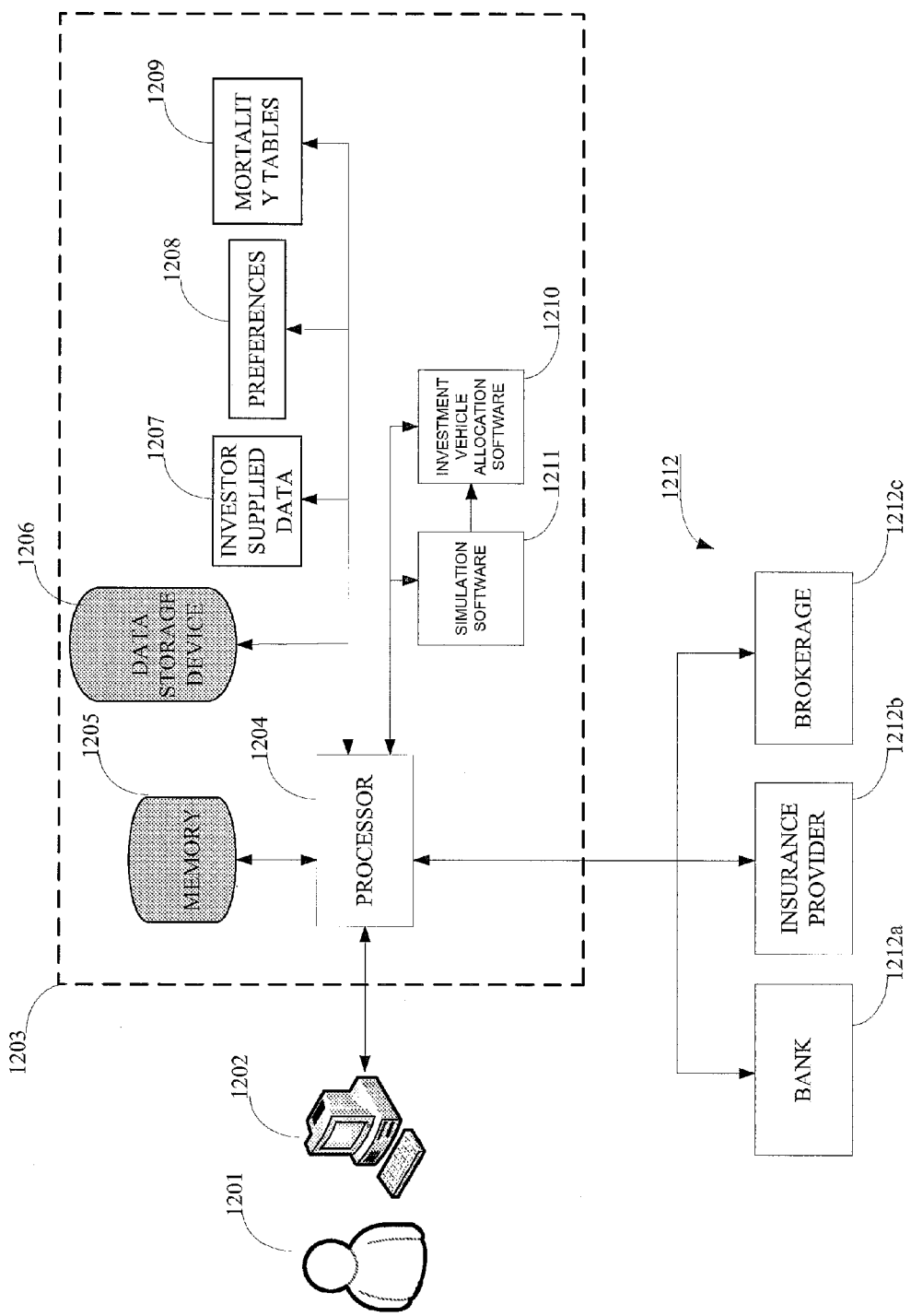
FIG. 12 illustrates a processing system operative to provide an allocation of assets and products.

FIG. 12 illustrates an embodiment that provides for the allocation of assets and products as described above. The asset and product allocation, in this embodiment, is provided through a computer program product including executable instructions stored on a computer readable medium. By way of example, a processor 1204 performs executable operations based on instructions received from the memory device 1205. Through the operations, the processor 1204 administers and tracks the asset and product allocation in a variety of ways. For example, the processor may be used for managing the investment vehicles, receiving investor-specific information, performing asset and product allocation computations and allocating an investor(s)' portfolio. The investor(s)' portfolio of assets and products may be accessed and allocated via financial institutions 1211 connected to processor 1204.

As illustrated in FIG. 12, the user 1201 may be an investor operative to access the investment portfolio allocation system 1203, e.g., at least one processing device, such as a server computer, via computer 1202, as generated and run on processor 1204 associated with the processing device 1203. The processor 1204 is operative to perform the computing operations described above. The system 1203 includes the processor 1204, memory device 1205, data storage device 1206, investor supplied data 1207, preferences 1208, mortality tables 1209, investment vehicle allocation software 1210, and simulation software 1211. It is also understood that system 1203 and related components, 1204-1211 may be disposed directly within the computer 1202, or may be distributed throughout a network.

Processor 1204 produces an asset and product allocation solution space by executing simulation software 1211 to simulate the investment vehicle allocations constructed by the investment vehicle allocation software 1210 and configured to communicate with investment vehicle allocation software 1210. Based on investor(s) supplied data 1207, preferences 1208, and mortality tables 1209, the processor 1204 calculates an allocation of assets and products.

Financial institutions 1212, which may include bank 1212*a*, insurance provider 1212*b*, and brokerage 1212*c* serve to process the asset and product allocation recommendations calculated by the system 1203. After calculating the recommended asset and product allocations, processor 1204 transmits data to each of the financial institutions 1212 with instructions to purchase specified amounts of the allocated assets and products. For example, insurance provider 1211*b* is instructed to purchase a certain amount of annuities for the investor, and brokerage 1211*c* is instructed to purchase a certain amount of common stock for the investor.

Figure 13:
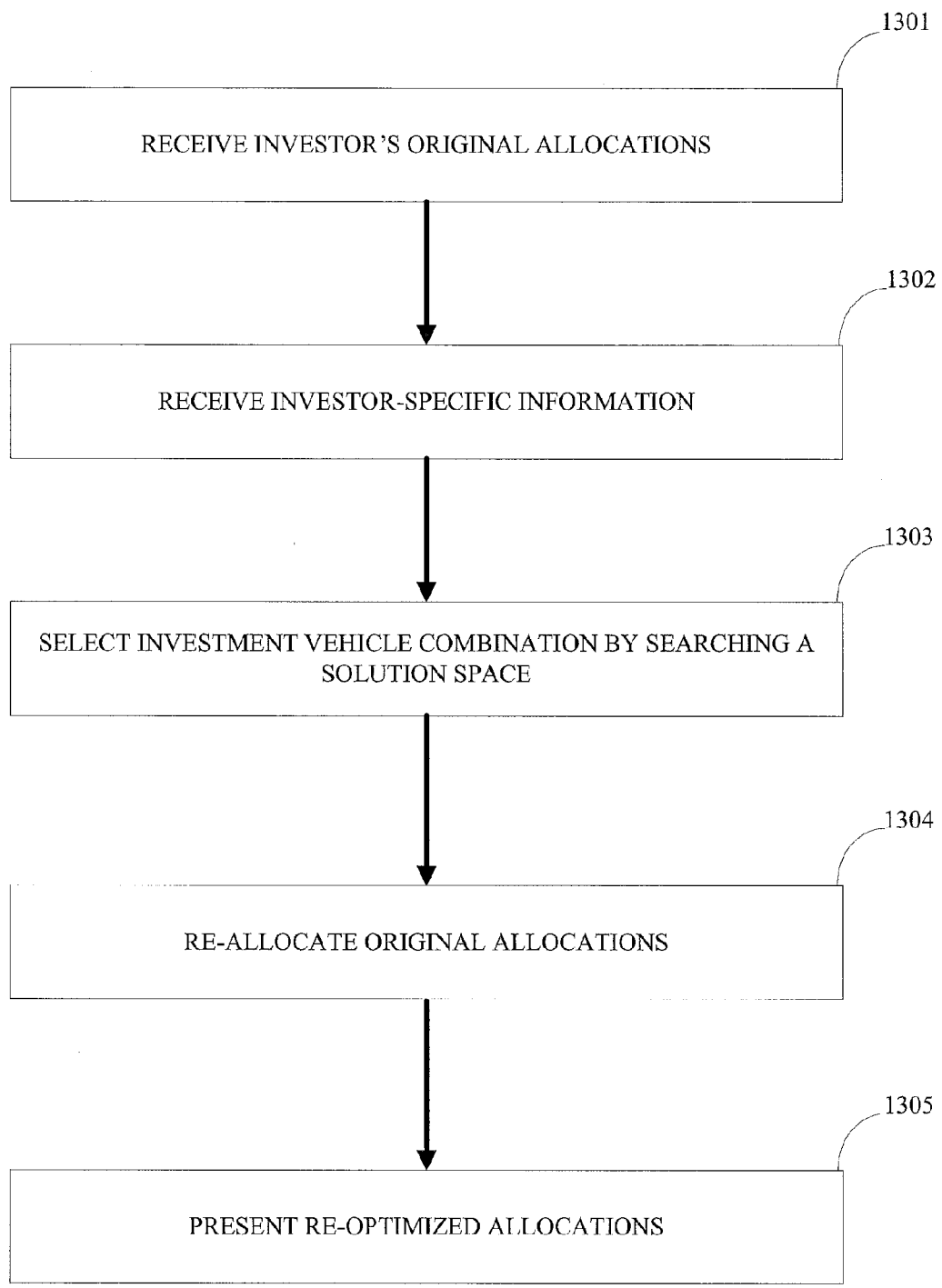

FIG. 13 illustrates a flowchart for one embodiment to re-optimize an allocation of assets and products among a plurality of financial products. Re-optimization, in some embodiments, differs from an allocation of assets among a plurality of financial products because an investor seeking re-optimization of a portfolio may hold both assets and products in a portfolio. Therefore, re-optimization is discussed in terms of allocations among assets and products. Re-optimization may be triggered at any time or for any reason. For example, re-optimization may be desired because of portfolio drift or different income needs, revised life expectancy outlook, transitioning retirement objectives, etc.

In step 1301 the investor's original asset and product allocations are received. In one embodiment the received asset and product allocations were calculated by using the embodiment illustrated in FIG. 1. In another embodiment the received asset and product allocations were calculated using another allocation system or method. Next, in step 1302, the investor-specific information, such as that described with respect to FIG. 5, is received. Next, in step 1303, the solution space is searched to determine an allocation of assets and products based on the investor-specific information. In one embodiment the solution space is calculated and searched using the steps outlined in FIG. 1. Next, in step 1304, the investor(s)' original asset and product allocations are re-allocated based on the information gathered in the previous steps, and in step 1305 the re-optimized asset and product allocation among a plurality of financial products is presented to the investor(s). The re-optimized asset and product allocation accounts for the possibility that some financial products, such as a FIA, cannot or are difficult to liquidate. Therefore the investor's portfolio, which consists of stocks and fixed income products (e.g., bonds, FIA), is allocated in a manner to account for the non-liquid financial products.

Figure 14:
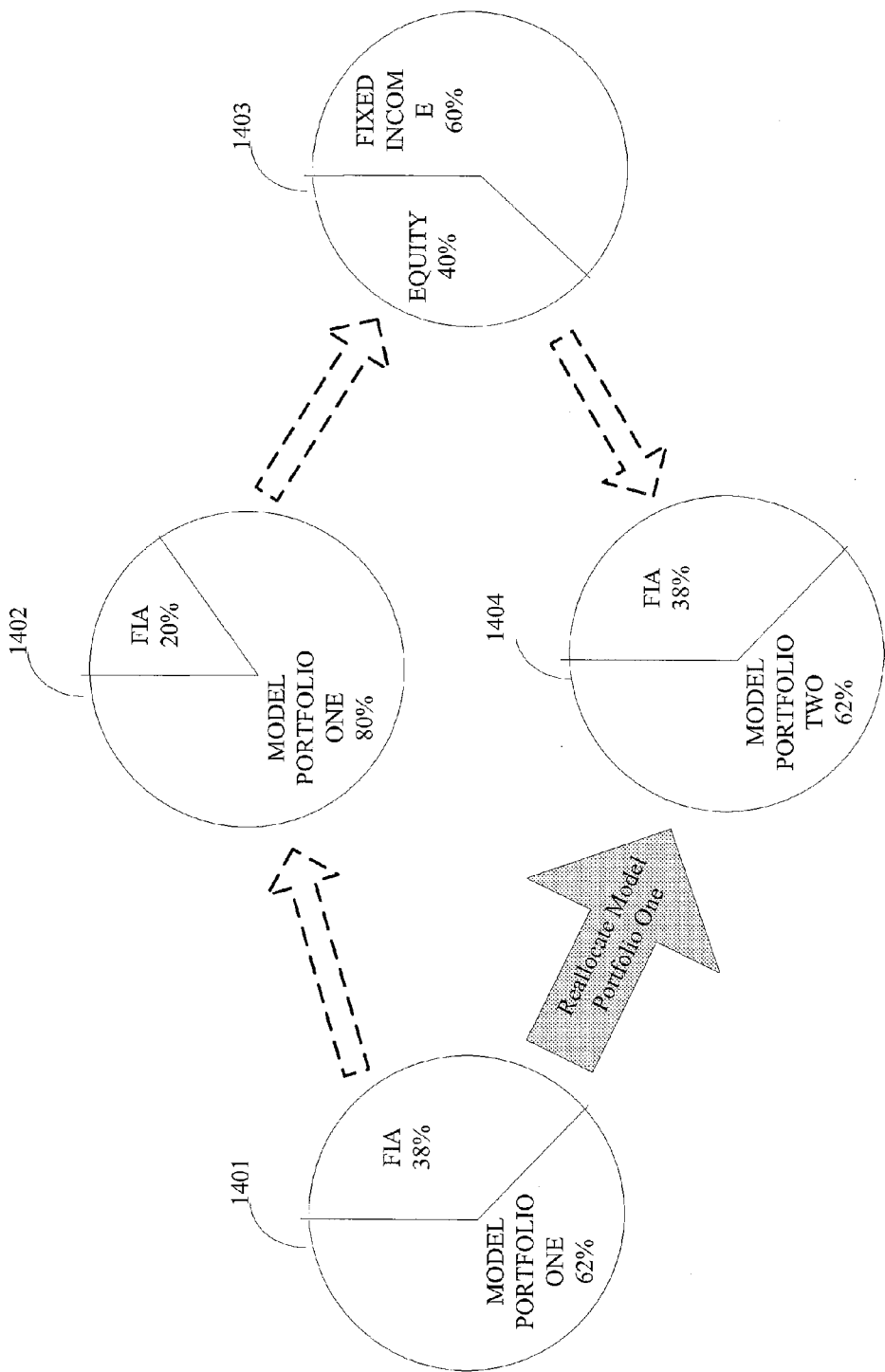

FIG. 14 shows one embodiment of the re-optimization steps described in FIG. 13 when an investor's portfolio should be re-optimized to reduce the amount allocated to fixed immediate annuities. Element 1401 depicts an investor's portfolio prior to re-optimization, which consists of 38% in FIA and 62% in model portfolio. In this embodiment, model portfolio one further consists of 50% equities and 50% fixed income. Element 1402 depicts a new suggested allocation of financial products based on investor-specific information after undergoing allocation such as that depicted in FIG. 1. The new allocation recommends a higher allocation to model portfolio one and a lower allocation to FIA.

To re-optimize to the new recommendation, the model portfolio and FIA in element 1402 are broken down and represented by element 1403 as allocations of equities (40%) and fixed income (60%), where the fixed income allocation includes the FIA. Based on the equity and fixed income percentages in element 1403, the allocations can be adjusted by, in this example, substituting in a different model portfolio, as shown in element 1404. In element 1404, model portfolio one (consisting of 50% equities and 50% fixed income) is replaced with a model portfolio two, consisting of 65% equities and 35% fixed income. Including the FIA, the overall allocation is now 40% equities and 60% fixed income, which is equivalent to element 1403. Thus, the allocations in element 1404 have a similar profile as the suggested allocations in element 1402, while allowing the investor to maintain the 38% of the FIA.

FIG. 15 depicts product combinations color-coded by their underlying traditional asset model portfolio. Five model portfolios are shown ranging in risk tolerance from the "Conservative" model portfolio, which is made up of 65% fixed-income holdings, to the "Aggressive" portfolio with 100% equity. In addition to the model portfolios, two annuity products have been selected; a deferred variable annuity with guaranteed living benefits rider (DVA/GLBR) and an immediate fixed annuity (IFA). The annuities, in 2% increments of the total portfolio, are combined with each model portfolio to form model portfolio and product combinations. The total annuity allocation is capped at 40%.

Each point on the plot represents a particular combination and every combination includes some allocation to annuities (with the exception of the five points that show the efficient income frontier for traditional assets only). Points that represent allocations that include the "Conservative" model portfolio generally provide lower legacy potential and lower income risk than other model portfolios. On the other extreme points that represent the "Aggressive" model portfolio have high legacy potential and high income risk.

The power of annuities is clearly visible in this example, since with their inclusion, the income frontier shifts from the thin line with circles to the continuous black line with their inclusion, in a similar fashion. Without annuities, our sample investor would only have the five points (100% of each model portfolio) to choose from and could not achieve an income risk level lower than 16%. Adding annuities rotates the income frontier outward and creates portfolios with higher legacy potential and lower income risk.

Figure 17:
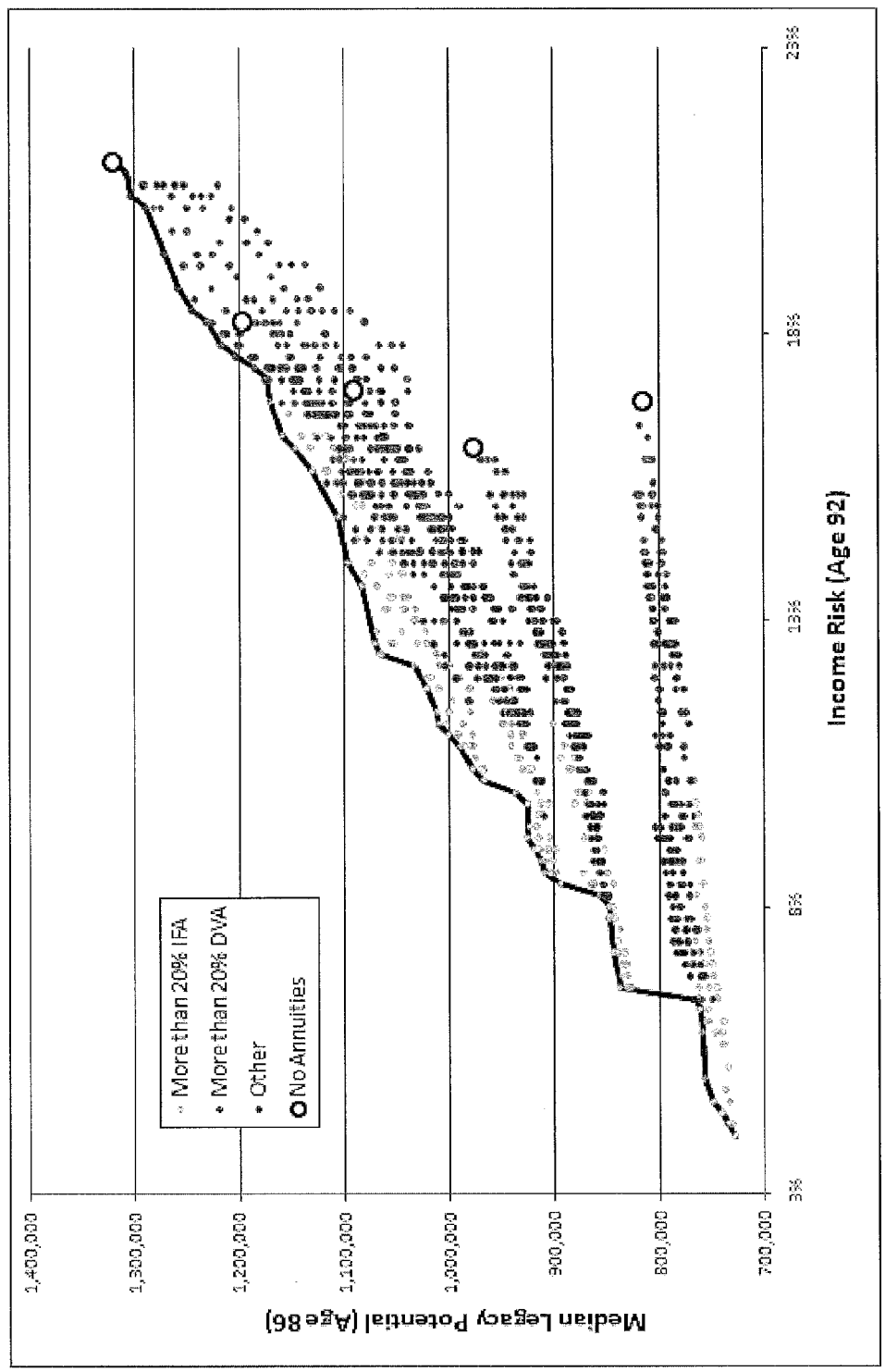

FIG. 17 shows the same product allocations, but with different annuity allocations. The points that have more than 20% allocated to the DVA/GLBR, tend to have high income risk and medium legacy potential values. The points that represent portfolios with more than 20% IFA, generally have low income risk and medium legacy potential. Finally, the points that depict all other combinations tend to have medium income risk across a wide range of legacy potential levels.

In this example, combinations of model portfolios and IFA seem to be the most efficient (fall on or near the income frontier), with DVA/GLBR-heavy combinations appearing sub-optimal. However, the results vary depending on the questionnaire answers and the underlying assumptions. For instance, a 3% initial withdrawal rate with a short life expectancy yields larger DVA allocations, and smaller IFAs allocations.

Figure 18:
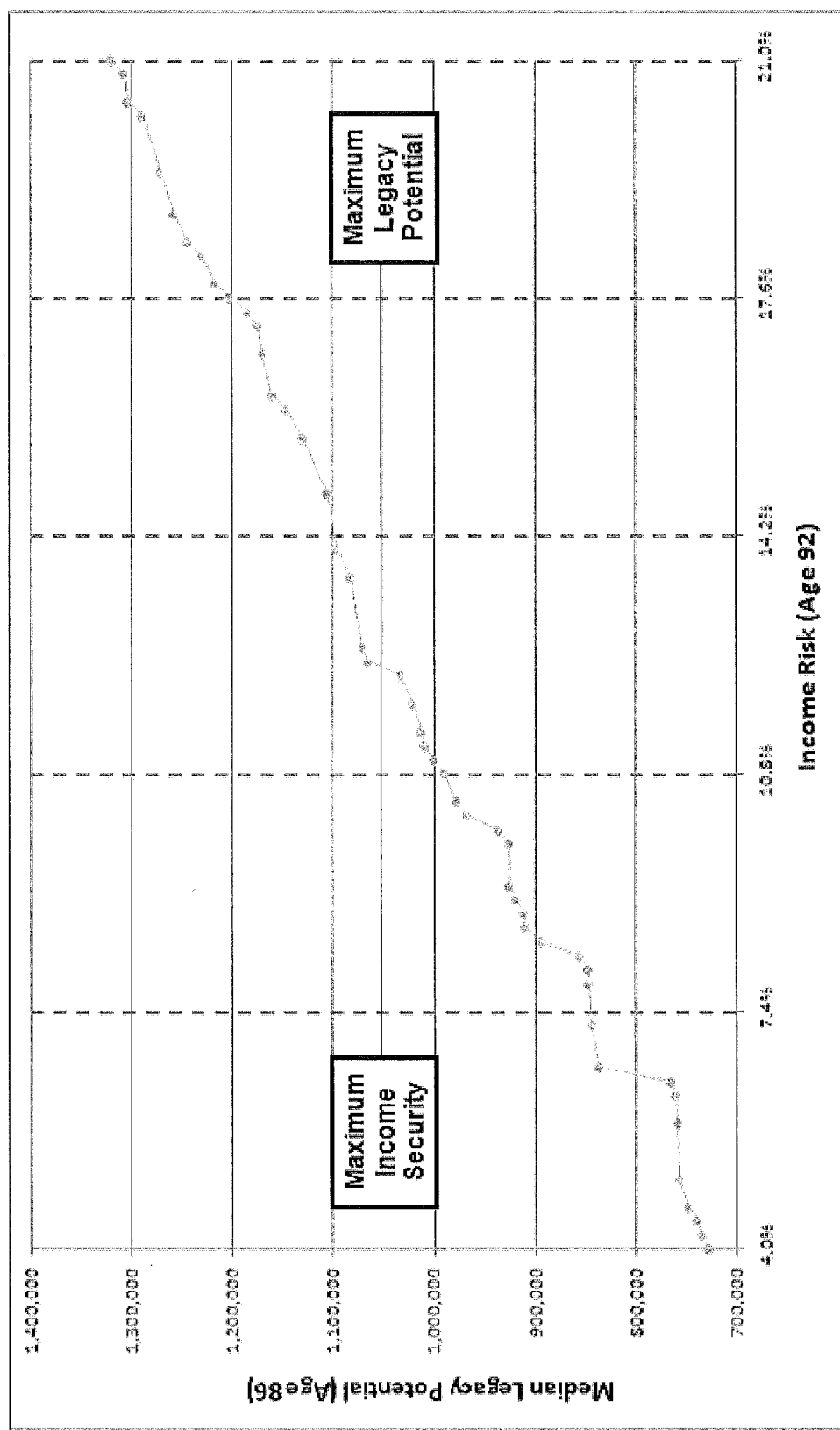

In the third step in the process, the efficient product combinations are separated from the non-efficient combinations. These points are shown in FIG. 18. The income frontier is then split into five even partitions (by income risk), corresponding to each of the five retirement objectives.

The system may then calculate the retirement ratio of each portfolio on the frontier line and find the maximum ratio within each partition. The ratio measures increases in legacy potential for incremental increases in income risk and the system determines therefrom the efficient product combinations that have relatively high ratios of return to risk. In certain instances the optimal portfolios may be apparent simply by looking for a point on the income frontier that has a large increase in legacy from one point to the next. For instance, the ninth point from the left is the optimal portfolio for the maximum income security objective.

The grid shown in FIG. 19 provides the optimal allocations to the model portfolio, IFA, and DVA for each retirement objective in this instance. There are three clear observations to be drawn from the grid: 1) As you move from Max Income Security to Max Legacy Potential the base model portfolios become more aggressive, and Income Risk and Legacy Potential both increase; 2) The total annuity allocation trends downward as the Retirement Objective moves towards Max Legacy Potential; and 3) All of the final recommended portfolios contain annuity allocations.

Observations 1 and 2 are both intuitive, since equities have a larger risk premium than fixed income, whether it is bonds or annuities. Observation 3 shows the added value, the mortality credits and the reduction in withdrawal strain, of adding income annuities (retirement "super bonds") to retirement portfolios. This example shows just one possible outcome of the system. The framework is entirely customizable, and modifications to the underlying assumptions can change results significantly. In addition, different answers to the investor questionnaire will place the investor on another income frontier and lead to a new optimal portfolio.

Figure 20:
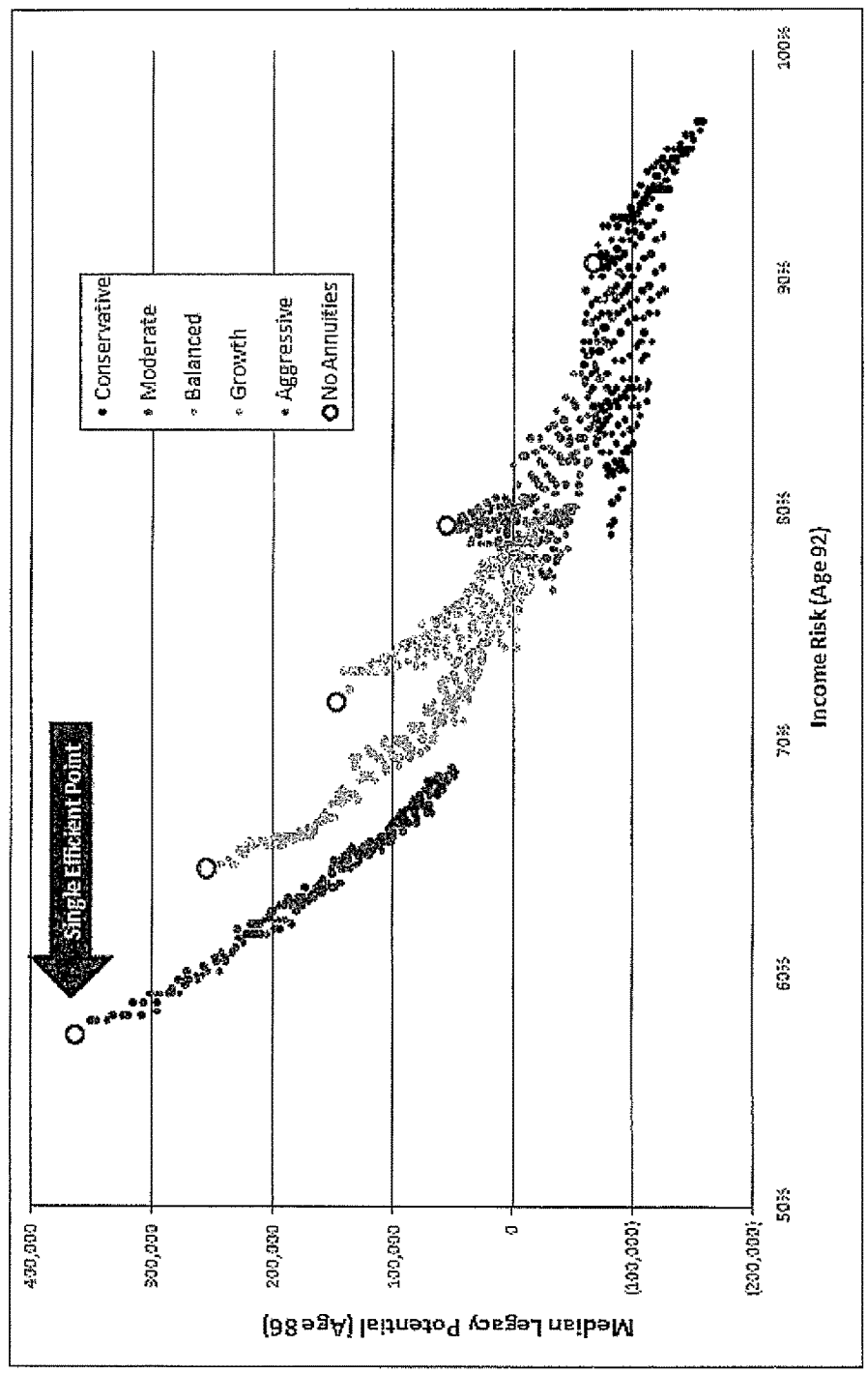

For instance, in another example, assume that investor's initial income need is $60,000 annually (instead of $40,000). This change alters the legacy potential and income risk values, and the layout of the 1155 product combinations. In this case, the investor is "underfunded", since his income need as a percentage of the investment creates very high income risk levels. For underfunded investors, the income frontier is often a single product combination, allocated entirely to equities, because the fixed-income assets usually do not produce enough return to meet the significant income strain on their portfolio, as shown in FIG. 20. This is an extreme example, because most investors would not be satisfied with such a high Income Risk (57.4%) and would alter spending (or find other income sources) to reduce risk. However, in this case there is only one point on the Efficient Income Frontier and, accordingly, there is only one recommended product combination, regardless of the investor's retirement objective.

Figure 21:
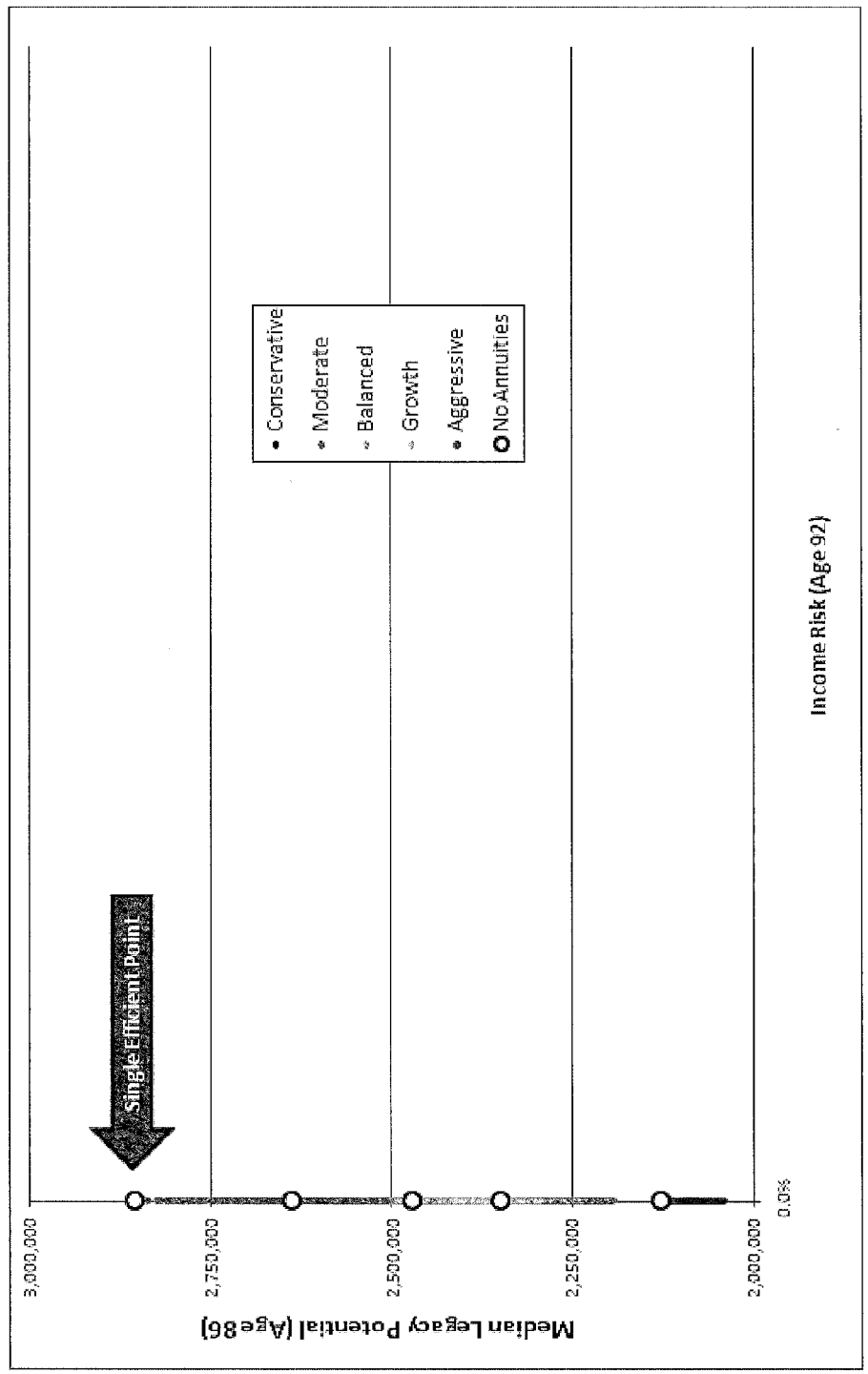

On the other extreme is the situation where the investor only wants to initially withdraw $10,000 from his investment. At this low income level, there is a very low likelihood of running out of money and the investor can afford to be aggressive with his investments. Product combinations appear vertically when graphed by income risk and legacy potential, with only one efficient point, as shown in FIG. 21.

Fixed-income securities and annuities are not very valuable to investors with relatively small income needs, because the income strain and likelihood of running out of money is so small. Ironically, the model recommends similar product combinations for those with very small and very large income needs, despite very different underlying rationale for the recommendations. In this example, the investor's income risk is 0%, which signifies that at a 1% inflation-adjusted withdrawal rate, the Aggressive Portfolio does not run out of money in any of the 500 Monte Carlo scenarios.

While the examples above are extreme, they highlight how dramatically income need impacts the income frontier and the recommended product combinations. The income frontier produces the most meaningful results (and the visually appealing upward-sloping chart), and thus adds the most value, for those with "constrained" income needs. Someone with a constrained income need has a strong probability of success, and a relatively low income risk, but benefits significantly from portfolio optimization. For a 65-year old with an average life expectancy, constrained initial inflation-adjusted withdrawal rates are typically between 2.5% and 5.5%. Overfunded investors have lower whereas underfunded investors have higher withdrawal rates.

Another example addresses a different investment stage of our investor's life. In the examples above, we assumed that the investor had already entered the decumulation stage of his life. In this example, we will consider the same investor if he was ten years younger. Now, at age 55, this investor plans to retire, and start using accumulated assets for income, ten years in the future. He may still earn labor income in the next 10 years, but he is a savvy investor and sees the benefit of planning for retirement now. For simplicity, we assume that his initial investment amount is still $1 million.

Since the investor's income needs will be met by wages for the next ten years the immediate fixed annuity from the previous examples might be inappropriate. In its place the system will consider a deferred income annuity with income starting at age 65. The deferred variable annuity is being included as well, with income deferred into retirement. Since our investor is planning ahead, his initial investment will have time to grow over the next ten years and he will be able to take a larger starting income at age 65. This higher income stream, $60,000 growing at 3% annually, will counter cost-of-living increases in the next ten years.

Figure 22:
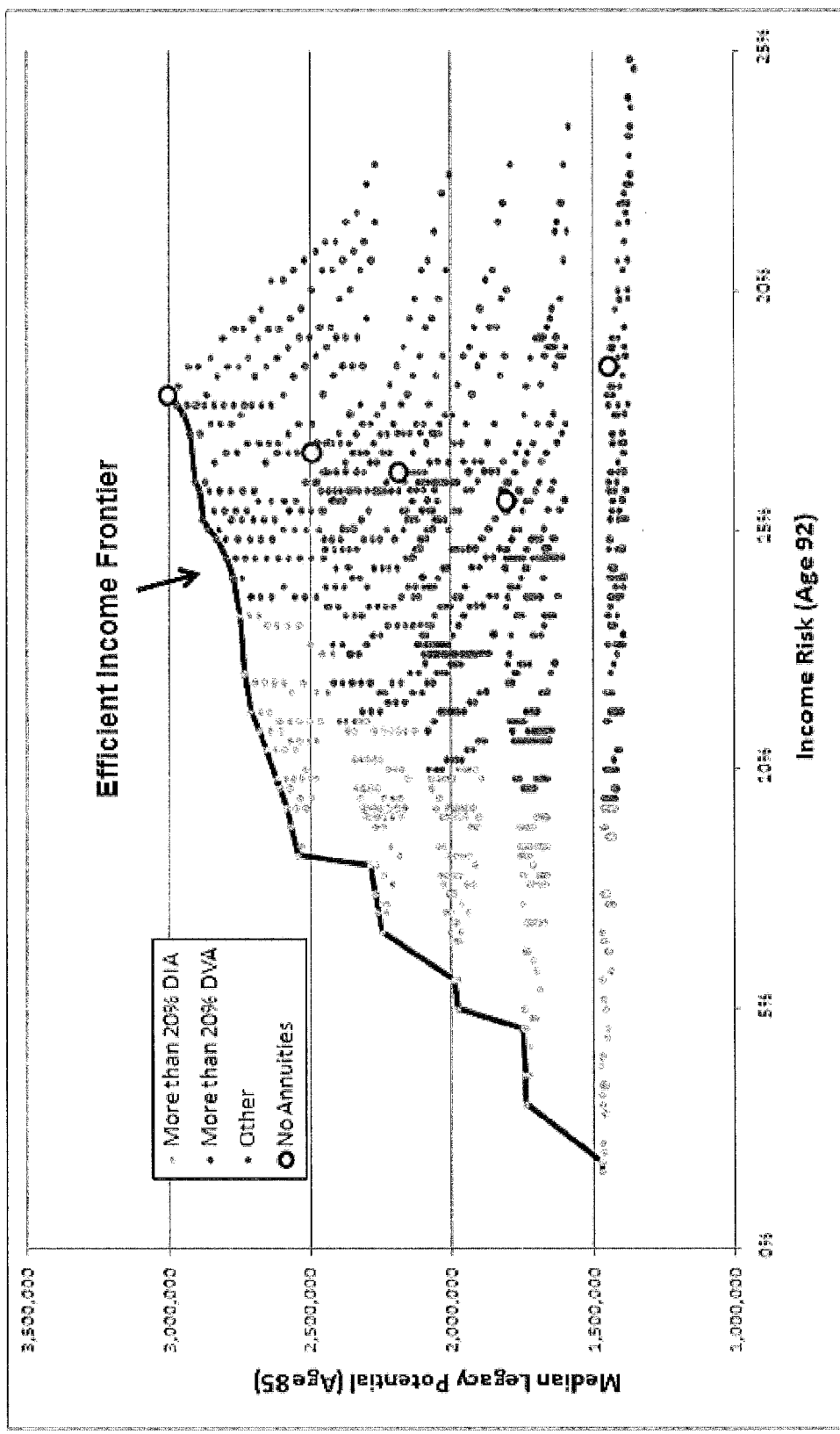

Applying the process disclosed herein to this example, the resulting outcomes and income frontier are shown in FIG. 22. Overall, the results look fairly similar to the first example; portfolios with large allocations to deferred income annuities fall on the left side (low income risk) of the chart and large allocations to the deferred variable annuities are on the right side (moderate to high income risks).

The five optimal portfolios (corresponding to the five retirement objectives), are chosen from the 32 portfolios that fall on the income frontier. In this instance, three of the recommended portfolios have maximum (40%) allocations to deferred income annuities, but the balance of the portfolio is more aggressive as the Retirement Objective moves towards maximum legacy potential, as shown in FIG. 23.

One interesting result of this example is that the ability to set up a retirement plan early enables the investor to take out more income (6%, versus the 4% initial withdrawal rate) with similar income risk, and end up with a larger legacy potential. Many financial advisors, loosely following Modern Portfolio Theory, might recommend target date funds or other accumulation strategies during this ten year period, but our example shows the benefit of decumulation planning and choosing guaranteed income sources before retirement.

The four examples discussed herein demonstrate how the framework presented herein caters to each investor's needs and how the income frontier changes depending on individual investor situations. The major strengths of the framework are its flexibility and objectivity; it can handle a wide range of user inputs and produces results-based recommendations that are not impacted by pre-set formulas or constraints.

As discussed herein, a flexible framework presented herein. As such, alternative retirement metrics may also be used in addition or in the alternative to the metrics discussed herein. For example, in lieu or in addition to income risk and legacy potential, metrics, such as the number of years that the retiree would not receive their desired income, the number of years that the retiree would not receive their desired income with an adjustment in income at certain times (e.g., 5, 10, etc. years after retirement), etc. FIGS. 24-26 depict sample calculations using alternative metrics.

FIGS. 1 through 26 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for processing data between intercommunicating software in memory comprising:

receiving, via a processor, investor-specified information, including investor factors, a subjective life expectancy of the investor, and a retirement objective value from a scale of preference between income risk and legacy potential, the investor factors including a withdrawal rate or income need;

executing, via the processor, investment vehicle allocation software from a first memory causing the processor to combine a permutation of the investor factors with a plurality of asset and product combinations including a set of model portfolios for various risk tolerances, the plurality of asset and product combinations having various percentages of a total investment allocated between fixed annuities, variable annuities, and the set of model portfolios;

executing, via the processor, simulation software from a second memory to facilitate intercommunication between the simulation software and the investment vehicle allocation software from the first memory to generate a solution space by simulating the combined permutation of the investor factors with the plurality of asset and product combinations from the investment vehicle allocation software from the first memory based on the subjective life expectancy, the solution space including median account balance plus death benefits at the subjective life expectancy and probability of assets remaining from the plurality of asset and product combinations for survival of the investor at a time horizon beyond the subjective life expectancy;

storing, via the processor, the solution space into a database;

partitioning, via the processor, the solution space within the database into sections corresponding to a range of retirement objectives;

identifying via the processor, from a given section of the solution space within the database that corresponds to the retirement objective value, an optimal financial product combination for the investor in a given one of the plurality of asset and product combinations; and transmitting, via the processor, instructions to one or more financial servers configured to process the instructions to perform operations based on the optimal financial production combination.

2. The computerized method of claim 1, wherein the solution space comprises a plurality of traditional and non-traditional asset combinations.

3. The computerized method of claim 2, wherein the non-traditional asset of at least one of the product combinations comprises at least one annuity.

4. The computerized method of claim 3, wherein the at least one annuity comprises at least one immediate annuity and at least one deferred annuity.

5. The computerized method of claim 2, wherein the traditional asset of at least one of the product combinations comprises a model portfolio of traditional assets.

6. The computerized method of claim 1, wherein the solution space comprises a plurality of combinations each including one or more of a plurality of model portfolios and one or more of a plurality of annuities.

7. The computerized method of claim 1, wherein the investor-specified information comprises a desired withdrawal rate and wherein the optimum financial product combination is identified further based on the desired withdrawal rate.

8. The computerized method of claim 1, comprising presenting the investor with a choice of subjective life expectancies comprising shorter than average, average, and longer than average, and wherein the subjective life expectancy received is one of shorter than average, average, and longer than average.

9. The computerized method of claim 8, wherein an average life expectancy is associated with an age of the investor when there is a 50% survival probability; a shorter than average life expectancy is associated with an age of the investor when there is a 75% chance of survival, and a longer than average life expectancy is associated with an age of the investor where there is a 25% chance of survival, and wherein the optimal financial product combination is identified further based on the age associated with the subjective life expectancy.

10. The computerized method of claim 1, comprising presenting the investor with the range of retirement objectives comprising a plurality of choices on a scale that indicates a preference of income risk relative to legacy potential, and identifying the optimal financial product combination based on a selected relative preference.

11. The computerized method of claim 1, comprising presenting the investor with the range of retirement objectives comprising a plurality of choices on a scale that indicates a preference for annual income in retirement, subject to a minimum level of expected legacy, and a maximum level of acceptable income risk, and identifying the optimal financial product combination based on a selected preference.

12. The computerized method of claim 10, wherein identifying the optimal financial product combination comprises identifying a subset of financial product combination based at least on the subjective life expectancy of the insured, identifying from the subset an efficient frontier line comprising a plurality of efficient financial product combinations over a range of income risk and legacy potential, splitting the frontier line into a plurality of partitions corresponding to a number of retirement objectives in the range of retirement objectives presented to the investor; and identifying the optimal financial product combination within a partition corresponding to the selected preference of income risk relative to legacy potential.

13. The computerized method of claim 12, comprising calculating a retirement ratio that measures an incremental increase in legacy potential for an incremental change in income risk for each efficient product combination in the corresponding partition, and wherein the optimal financial product combination is identified as the efficient product combination with a greatest retirement ratio.

14. The computerized method of claim 13, performing computational operations, via the processor, to calculate the retirement ratio based the following formula:

$$\text{Retirement Ratio} = \frac{LegacyPotential_x - LegacyPotential_y}{\text{Investment} \times (\psi_x - \psi_y)}$$

where x is an efficient financial product combination of being evaluated, y is an efficient financial product combination with a lost a lowest income risk, and ψ is a statistical distribution of risk for a given financial product combination.

15. A system for processing data between intercommunicating software in memory, the system comprising:
at least one memory device including a first memory and a second memory; and
at least one processor operable to:
receive investor-specified information from a computer device over a network, the investor-specified information including investor factors, a subjective life expectancy of the investor, and a retirement objective value from a scale of preference between income risk and legacy potential, the investor factors including a withdrawal rate or income need;
retrieve and execute investment vehicle allocation software from the first memory causing the processor to combine a permutation of the investor factors with a plurality of asset and product combinations including a set of model portfolios for various risk tolerances, the plurality of asset and product combinations having various percentages of a total investment allocated between fixed annuities, variable annuities, and the set of model portfolios;
retrieve and execute simulation software from the second memory to facilitate intercommunication between the simulation software and the investment vehicle allocation software from the first memory to generate a solution space by simulating the combined permutation of the investor factors with the plurality of asset and product combinations from the investment vehicle allocation software from the first memory based on the subjective life expectancy, the solution space including median account balance plus death benefits at the subjective life expectancy and probability of assets remaining from the plurality of asset and product combinations for survival of the investor at a time horizon beyond the subjective life expectancy;
store the solution space into a database;
partition the solution space within the database into sections corresponding to a range of retirement objectives;
identify from a given section of the solution space within the database that corresponds to the retirement objective value, an optimal financial product combination for the investor in a given one of the plurality of asset and product combinations; and
transmit instructions to one or more financial servers configured to process the instructions to perform operations based on the optimal financial production combination.

16. The system of method of claim 15, wherein the solution space comprises a plurality of traditional and non-traditional asset combinations.

17. The system of claim 16, wherein the non-traditional asset of at least one of the product combinations comprises at least one annuity.

18. The system of claim 17, wherein the at least one annuity comprises at least one immediate annuity and at least one deferred annuity.

19. The system of claim 16, wherein the traditional asset of at least one of the product combinations comprises a model portfolio of traditional assets.

20. The system of claim 15, wherein the solution space comprises a plurality of combinations each including one or more of a plurality of model portfolios and one or more of a plurality of annuities.

21. The system of claim 15, wherein the investor-specified information comprises a desired withdrawal rate and wherein the optimum financial product combination is identified further based on the desired withdrawal rate.

22. The system of claim 15, further operable to present the investor with a choice of subjective life expectancies comprising shorter than average, average, and longer than average, and wherein the subjective life expectancy received is one of shorter than average, average, and longer than average.

23. The system of claim 22, wherein an average life expectancy is associated with an age of the investor when there is a 50% survival probability; a shorter than average life expectancy is associated with an age of the investor when there is a 75% chance of survival, and a longer than average life expectancy is associated with an age of the investor where there is a 25% chance of survival, and wherein the optimal financial product combination is identified further based on the age associated with the subjective life expectancy.

24. The system of claim 15, further operable to present the investor with the range of retirement objectives comprising a plurality of choices on a scale that indicates a preference of income risk relative to legacy potential, and identifying the optimal financial product combination based on a selected relative preference.

25. The system of claim 24, wherein to identify the optimal financial product combination comprises to identify a subset of financial product combination based at least on the subjective life expectancy of the insured, identify from the subset an efficient frontier line comprising a plurality of efficient financial product combinations over a range of income risk and legacy potential, split the frontier line into a plurality of partitions corresponding to a number of retirement objectives in the range of retirement objectives presented to the investor; and identify the optimal financial product combination within a partition corresponding to the selected preference of income risk relative to legacy potential.

26. The system of claim 25, further operable to calculate a retirement ratio that measures an incremental increase in legacy potential for an incremental change in income risk for each efficient product combination in the corresponding partition, and wherein the optimal financial product combination is identified as the efficient product combination with a greatest retirement ratio.

27. The system of claim 26, performing computational operations, via the processor, to calculate the retirement ratio based on the following formula:

$$\text{Retirement Ratio} = \frac{LegacyPotential_x - LegacyPotential_y}{Investment \times (\psi_x - \psi_y)}$$

where x is an efficient financial product combination of being evaluated, y is an efficient financial product combination with a lost a lowest income risk, and $\psi$ is a statistical distribution of risk for a given financial product combination.

* * * * *